US008647192B2

(12) United States Patent
Ward et al.

(10) Patent No.: US 8,647,192 B2
(45) Date of Patent: Feb. 11, 2014

(54) GAMING SYSTEM HAVING OPERATOR CONFIGURABLE SUPPLEMENTAL FEATURES

(75) Inventors: Matthew J. Ward, Northbrook, IL (US); Mary M. Burke, Somonauk, IL (US); Peter R. Anderson, Glenview, IL (US)

(73) Assignee: WMS Gaming Inc., Waukegan, IL (US)

( * ) Notice: Subject to any disclaimer, the term of this patent is extended or adjusted under 35 U.S.C. 154(b) by 1058 days.

(21) Appl. No.: 12/668,070

(22) PCT Filed: Jul. 15, 2008

(86) PCT No.: PCT/US2008/008600
§ 371 (c)(1),
(2), (4) Date: Jan. 7, 2010

(87) PCT Pub. No.: WO2009/011832
PCT Pub. Date: Jan. 22, 2009

(65) Prior Publication Data

US 2011/0014971 A1 Jan. 20, 2011

Related U.S. Application Data

(60) Provisional application No. 60/961,025, filed on Jul. 18, 2007, provisional application No. 60/998,685, filed on Oct. 12, 2007.

(51) Int. Cl.
*A63F 9/24* (2006.01)
*A63F 13/00* (2006.01)

(52) U.S. Cl.
USPC .................. 463/25; 463/16; 463/20; 463/29; 463/42; 273/138.1; 273/138.2; 273/143 R

(58) Field of Classification Search
USPC ........... 463/16, 20, 21, 25, 29, 42; 273/138.1, 273/138.2, 143 R
See application file for complete search history.

(56) References Cited

U.S. PATENT DOCUMENTS 5,042,809 A 8/1991 Richardson
5,083,271 A 1/1992 Thacher et al.

(Continued)

FOREIGN PATENT DOCUMENTS

AU 2005-251830 12/2005
WO 2005/120672 12/2005

(Continued)

OTHER PUBLICATIONS

Office Action from Co-Pending Australian Patent Application No. 2008276564, Dated Mar. 14, 2012.

(Continued)

*Primary Examiner* — Dmitry Suhol
*Assistant Examiner* — Ryan Hsu
(74) *Attorney, Agent, or Firm* — Nixon Peabody LLP

(57) ABSTRACT

A gaming system comprises a wager input device for receiving a primary wager and at least one display for displaying a selected primary wagering game, the selected primary wagering game having a primary payback percentage. The system includes a control interface displayed on the at least one display, the control interface comprising a plurality of available supplemental features. At least one controller is operative to (i) receive an operator activation selection of a supplemental feature selected from the plurality of available supplemental features; (ii) receive an operator configuration selection of at least one parameter of the selected supplement feature, the at least one parameter including a feature payback percentage of the selected supplemental feature; (iii) active availability of the selected supplemental feature for the play by a player of the selected primary wagering game; and (iv) display an overall payback percentage on the control interface.

21 Claims, 18 Drawing Sheets

(56) References Cited

U.S. PATENT DOCUMENTS

| | | | | |
|---|---|---|---|---|
| 5,655,961 | A | 8/1997 | Acres et al. | |
| 5,761,649 | A | 6/1998 | Hill | |
| 5,851,149 | A | 12/1998 | Xidos et al. | |
| 5,993,316 | A | 11/1999 | Coyle et al. | |
| 6,155,925 | A | 12/2000 | Giobbi et al. | |
| 6,217,448 | B1 | 4/2001 | Olsen | |
| RE37,885 | E | 10/2002 | Acres et al. | |
| 6,645,077 | B2 | 11/2003 | Rowe | |
| 6,656,048 | B2 | 12/2003 | Olsen | |
| 6,802,778 | B1 * | 10/2004 | Lemay et al. | 463/42 |
| 6,843,723 | B2 | 1/2005 | Joshi | |
| 6,939,226 | B1 | 9/2005 | Joshi | |
| RE38,812 | E | 10/2005 | Acres et al. | |
| 6,960,136 | B2 | 11/2005 | Joshi et al. | |
| 6,974,385 | B2 | 12/2005 | Joshi et al. | |
| 6,991,543 | B2 | 1/2006 | Joshi | |
| 7,144,321 | B2 | 12/2006 | Mayeroff | |
| 7,285,049 | B1 | 10/2007 | Luciano, Jr. et al. | |
| 7,666,094 | B2 | 2/2010 | Baerlocher et al. | |
| 7,674,178 | B2 | 3/2010 | Baerlocher et al. | |
| 7,674,179 | B2 | 3/2010 | Baerlocher et al. | |
| 7,677,971 | B2 | 3/2010 | Baerlocher et al. | |
| 7,677,972 | B2 | 3/2010 | Baerlocher et al. | |
| 7,682,248 | B2 | 3/2010 | Baerlocher et al. | |
| 7,914,377 | B2 | 3/2011 | Benbrahim et al. | |
| 7,922,576 | B2 * | 4/2011 | Schneider | 463/25 |
| 7,934,989 | B2 | 5/2011 | Joshi et al. | |
| 8,147,323 | B2 | 4/2012 | Joshi et al. | |
| 8,221,228 | B2 | 7/2012 | Anderson et al. | |
| 8,267,797 | B2 | 9/2012 | Thomas et al. | |
| 8,313,382 | B2 | 11/2012 | Ward | |
| 8,449,366 | B2 | 5/2013 | Thomas | |
| 2001/0004607 | A1 | 6/2001 | Olsen | |
| 2002/0107072 | A1 * | 8/2002 | Giobbi | 463/42 |
| 2005/0197191 | A1 | 9/2005 | McKinley et al. | |
| 2006/0073887 | A1 | 4/2006 | Nguyen et al. | |
| 2006/0073888 | A1 | 4/2006 | Nguyen et al. | |
| 2006/0084496 | A1 | 4/2006 | Jaffe et al. | |
| 2006/0142079 | A1 | 6/2006 | Ikehara et al. | |
| 2006/0148549 | A1 | 7/2006 | Walker et al. | |
| 2006/0252530 | A1 | 11/2006 | Oberberger et al. | |
| 2006/0264256 | A1 * | 11/2006 | Gagner et al. | 463/20 |
| 2007/0060258 | A1 | 3/2007 | Duhamel | |
| 2007/0060314 | A1 | 3/2007 | Baerlocher et al. | |
| 2007/0060321 | A1 | 3/2007 | Vasquez et al. | |
| 2007/0155490 | A1 | 7/2007 | Phillips et al. | |
| 2007/0191088 | A1 | 8/2007 | Breckner et al. | |
| 2007/0218975 | A1 | 9/2007 | Iddings et al. | |
| 2007/0225065 | A1 | 9/2007 | Wright et al. | |
| 2007/0259709 | A1 | 11/2007 | Kelly et al. | |
| 2007/0293293 | A1 | 12/2007 | Baerlocher et al. | |
| 2007/0298857 | A1 | 12/2007 | Schlottmann et al. | |
| 2007/0298874 | A1 | 12/2007 | Baerlocher et al. | |
| 2007/0298875 | A1 | 12/2007 | Baerlocher et al. | |
| 2008/0020830 | A1 | 1/2008 | Ikehara et al. | |
| 2008/0020831 | A1 | 1/2008 | Ikehara et al. | |
| 2008/0020832 | A1 | 1/2008 | Iddings et al. | |
| 2008/0020833 | A1 | 1/2008 | Baerlocher et al. | |
| 2008/0020834 | A1 | 1/2008 | Breckner et al. | |
| 2008/0020846 | A1 | 1/2008 | Vasquez et al. | |
| 2008/0045344 | A1 | 2/2008 | Schlottmann et al. | |
| 2008/0064502 | A1 | 3/2008 | Schlottmann et al. | |
| 2008/0070680 | A1 | 3/2008 | Baerlocher et al. | |
| 2008/0070692 | A1 | 3/2008 | Schlottmann et al. | |
| 2008/0070693 | A1 | 3/2008 | Schlottmann et al. | |
| 2008/0070694 | A1 | 3/2008 | Schlottmann et al. | |
| 2008/0070695 | A1 | 3/2008 | Baerlocher et al. | |
| 2008/0076514 | A1 | 3/2008 | Baerlocher et al. | |
| 2008/0076515 | A1 | 3/2008 | Baerlocher et al. | |
| 2008/0076517 | A1 | 3/2008 | Baerlocher et al. | |
| 2008/0076552 | A1 | 3/2008 | Baerlocher et al. | |
| 2008/0113770 | A1 | 5/2008 | Gelber et al. | |
| 2008/0148542 | A1 * | 6/2008 | Mayeroff | 29/428 |
| 2009/0117969 | A1 | 5/2009 | Englman | |
| 2009/0143136 | A1 | 6/2009 | Thomas | |
| 2009/0186692 | A1 | 7/2009 | Thomas et al. | |
| 2009/0291752 | A1 | 11/2009 | Anderson et al. | |
| 2009/0305776 | A1 | 12/2009 | Englman et al. | |
| 2010/0029369 | A1 | 2/2010 | Pacey | |
| 2010/0048283 | A1 * | 2/2010 | Anderson et al. | 463/20 |
| 2010/0048293 | A1 | 2/2010 | Hornik | |
| 2010/0062841 | A1 | 3/2010 | Englman et al. | |
| 2010/0075746 | A1 | 3/2010 | Anderson et al. | |
| 2010/0087256 | A1 | 4/2010 | Frattinger et al. | |
| 2010/0167817 | A1 | 7/2010 | Anderson et al. | |
| 2010/0216544 | A1 | 8/2010 | Hamlin | |
| 2010/0234105 | A1 | 9/2010 | Gagner et al. | |
| 2010/0248818 | A1 | 9/2010 | Aoki et al. | |
| 2010/0255900 | A1 | 10/2010 | Ansari et al. | |
| 2010/0255901 | A1 | 10/2010 | Garvey et al. | |
| 2010/0255912 | A1 | 10/2010 | Ward | |
| 2010/0261521 | A1 | 10/2010 | Oatman et al. | |
| 2010/0291998 | A1 | 11/2010 | Anderson et al. | |
| 2010/0317433 | A1 | 12/2010 | Ansari et al. | |
| 2011/0034237 | A1 | 2/2011 | Schulhof et al. | |
| 2011/0053672 | A1 | 3/2011 | Gagner et al. | |
| 2011/0212785 | A1 | 9/2011 | Gura et al. | |
| 2011/0230254 | A1 | 9/2011 | Englman et al. | |
| 2011/0250955 | A1 | 10/2011 | Adiraju et al. | |
| 2011/0287828 | A1 | 11/2011 | Anderson et al. | |
| 2011/0300925 | A1 | 12/2011 | Adiraju et al. | |
| 2012/0077564 | A1 | 3/2012 | Collette et al. | |
| 2013/0040725 | A1 | 2/2013 | Ward | |

FOREIGN PATENT DOCUMENTS

| | | |
|---|---|---|
| WO | 2006/076185 | 7/2006 |
| WO | 2007/089410 | 8/2007 |
| WO | 2008/030904 | 3/2008 |

OTHER PUBLICATIONS

Written Opinion corresponding to co-pending International Patent Application Serial No. PCT/US2008/008600, United States Patent Office, dated Oct. 23, 2008.

International Search Report corresponding to co-pending International Patent Application Serial No. PCT/US2008/008600, United States Patent Office, dated Oct. 23, 2008.

International Preliminary Report on Patentability corresponding to co-pending International Patent Application Serial No. PCT/US2008/008600, United States Patent Office, dated Aug. 28, 2009.

* cited by examiner

GAMING SYSTEM HAVING OPERATOR CONFIGURABLE SUPPLEMENTAL FEATURES

CROSS REFERENCE TO RELATED APPLICATIONS

This application is a U.S. national stage of International Application No. PCT/US2008/008600, filed Jul. 15, 2008, which claims the benefit of U.S. Provisional Application No. 60/961,025, filed Jul. 18, 2007, and U.S. Provisional Application No. 60/998,685, filed Oct. 12, 2007, each of which is incorporated by reference herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming machines, and methods for playing wagering games, and more particularly, to a gaming system having operator configurable supplemental features.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome in the basic game. Generally, bonus games provide a greater expectation of winning than the basic game and may also be accompanied with more attractive or unusual video displays and/or audio. Bonus games may additionally award players with "progressive jackpot" awards that are funded, at least in part, by a percentage of coin-in from the gaming machine or a plurality of participating gaming machines. Because the bonus game concept offers tremendous advantages in player appeal and excitement relative to other known games, and because such games are attractive to both players and operators, there is a continuing need to develop gaming systems with new types of bonus games to satisfy the demands of players and operators.

Traditionally, wagering games have employed relatively smaller numbers of bonus or supplemental features. Moreover, such bonus features were configured so as to be permanently associated with certain basic or primary wagering games. One problem that arises is that an operator of wagering games had only limited control options available regarding configuration of supplemental features for use with primary wagering games. Another problem exists in that traditional systems failed to adequately inform operators as to the status of an overall payback percentage of a gaming system taking into account one or more activated supplemental features. Moreover, even systems which allowed operators to associate and disassociate supplemental features with primary wagering games fail to provide complete customization options relative to configuration of one or more supplemental features for use with one or more primary wagering games while allowing the operator to maintain control over payback percentages. The present invention is directed to solving these and other problems.

SUMMARY OF THE INVENTION

According to one aspect of the present invention, a gaming system comprises a wager input device for receiving a primary wager and at least one display for displaying a selected primary wagering game, the selected primary wagering game having a primary payback percentage. The system includes a control interface displayed on the at least one display, the control interface comprising a plurality of available supplemental features. At least one controller is operative to (i) receive an operator activation selection of a supplemental feature selected from the plurality of available supplemental features; (ii) receive an operator configuration selection of at least one parameter of the selected supplemental feature, the at least one parameter including a feature payback percentage of the selected supplemental feature; (iii) activate availability of the selected supplemental feature for play by a player of the selected primary wagering game; and (iv) display an overall payback percentage on the control interface, the overall payback percentage being a function of the primary payback percentage and the feature payback percentage of the selected supplemental feature.

According to another aspect of the invention, a method of operating a wagering game comprises receiving a primary wager, displaying a selected primary wagering game, the selected primary wagering game having a primary payback percentage, and displaying on a control interface a plurality of available supplemental features. The method further comprises receiving an operator activation selection of a supplemental feature selected from the plurality of available supplemental features, the selected supplemental feature having a feature payback percentage, activating availability of the selected supplemental feature for play by a player of the selected primary wagering game, and displaying an overall payback percentage on the control interface, the overall payback percentage being a function of the primary payback percentage and the feature payback percentage of the selected supplemental feature.

According to yet another aspect of the invention, a method of configuring supplemental features on a gaming system comprises displaying on a control terminal a plurality of available primary wagering games and a plurality of available supplemental features, the control terminal in communication with a plurality of gaming displays. The method further comprises receiving a selection of a first primary wagering game selected from the plurality of available primary wager games, the first primary wagering game having a primary payback percentage, and receiving a selection of a first supplemental feature selected from the plurality of available supplemental features, the first supplemental feature having a first feature payback percentage. The method further comprises displaying an overall payback percentage on the control terminal, the overall payback percentage a function of the primary payback percentage and the first feature payback percentage, and activating availability of the first supplemental feature for play by a player of the first primary wagering game.

According to yet another embodiment of the invention, one or more computer readable storage media encoded with instructions for executing a method of operating a gaming system. The method comprises displaying a control interface on a primary display of the gaming system, the control interface displaying a plurality of available primary wagering games and a plurality of available supplemental features. In response to an operator configuration input, at least one combination of a first primary wagering game and a first supplemental feature is stored. In response to an operator activation input, a selected wagering game is activated. The selected wagering game comprises one or more of (i) one of the plurality of available primary wagering games, (ii) one of the available supplemental features, and (iii) the at least one combination. The selected wagering game is displayed.

According to yet another aspect of the invention, a computer readable storage medium is encoded with instructions for directing a gaming system to perform the above methods.

Additional aspects of the invention will be apparent to those of ordinary skill in the art in view of the detailed description of various embodiments, which is made with reference to the drawings, a brief description of which is provided below.

DETAILED DESCRIPTION

Figure 1A:
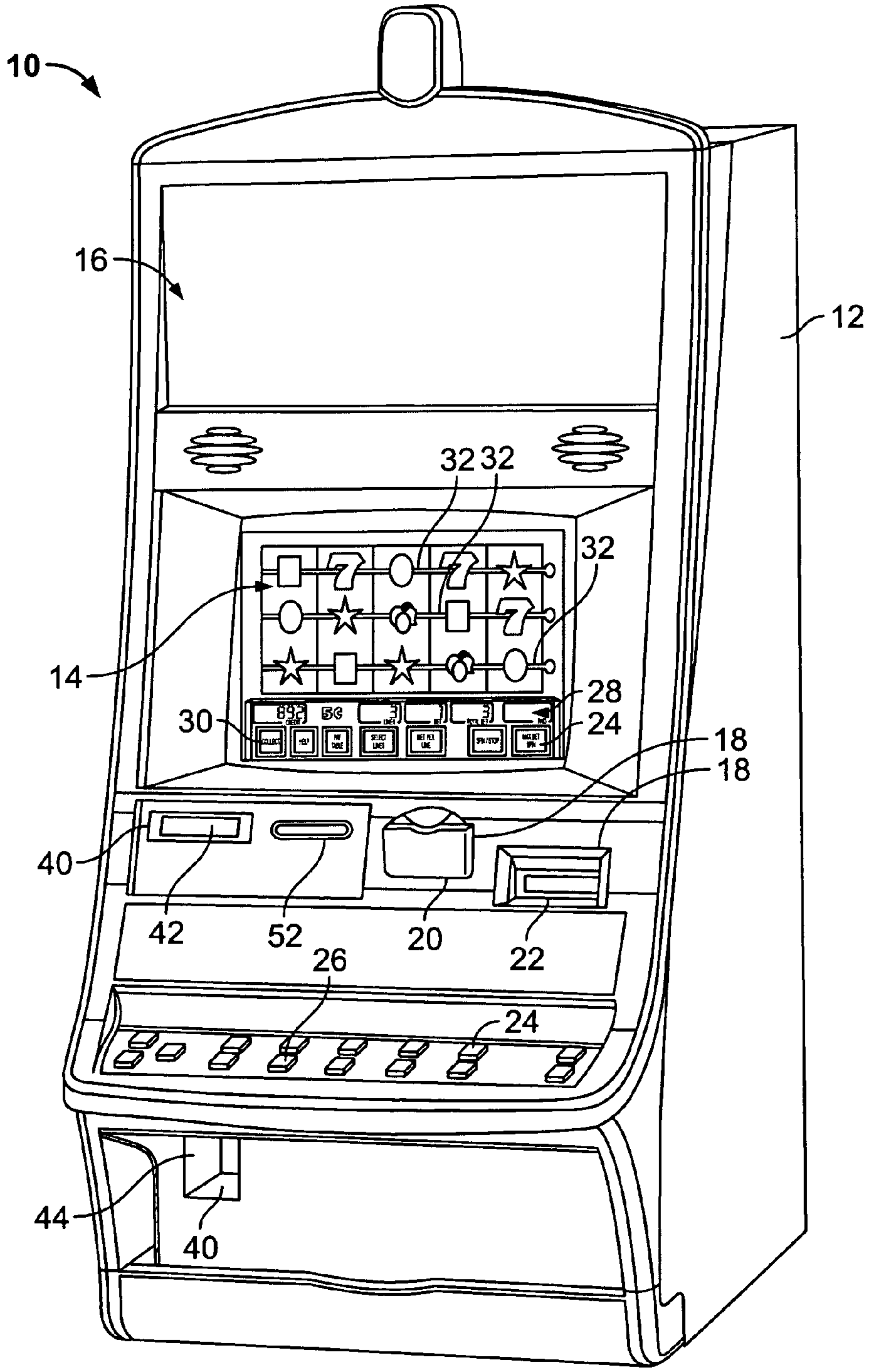
FIG. 1*a* is a perspective view of a free standing gaming machine embodying the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1*a*, a gaming machine 10 is used in gaming establishments such as casinos. With regard to the present invention, the gaming machine 10 may be any type of gaming machine and may have varying structures and methods of operation. For example, the gaming machine 10 may be an electromechanical gaming machine configured to play mechanical slots, any other game compatible with a display comprising at least one symbol-bearing reel strip. The gaming machine 10 may also be a hybrid gaming machine integrating both electronic and electromechanical displays.

The gaming machine 10 comprises a housing 12 and includes input devices, including a value input device 18 and a player input device 24. For output the gaming machine 10 includes a primary display 14 for displaying information about the basic wagering game. The primary display 14 can also display information about a bonus wagering game and a progressive wagering game. The gaming machine 10 may also include a secondary display 16 for displaying game events, game outcomes, and/or signage information. While these typical components found in the gaming machine 10 are described below, it should be understood that numerous other elements may exist and may be used in any number of combinations to create various forms of a gaming machine 10.

The value input device 18 may be provided in many forms, individually or in combination, and is preferably located on the front of the housing 12. The value input device 18 receives currency and/or credits that are inserted by a player. The value input device 18 may include a coin acceptor 20 for receiving coin currency (see FIG. 1*a*). Alternatively, or in addition, the value input device 18 may include a bill acceptor 22 for receiving paper currency. Furthermore, the value input device 18 may include a ticket reader, or barcode scanner, for reading information stored on a credit ticket, a card, or other tangible portable credit storage device. The credit ticket or card may also authorize access to a central account, which can transfer money to the gaming machine 10.

The player input device 24 comprises a plurality of push buttons 26 on a button panel for operating the gaming machine 10. In addition, or alternatively, the player input device 24 may comprise a touch screen 28 mounted by adhesive, tape, or the like over the primary display 14 and/or secondary display 16. The touch screen 28 contains soft touch keys 30 denoted by graphics on the underlying primary display 14 and used to operate the gaming machine 10. The touch screen 28 provides players with an alternative method of input. A player enables a desired function either by touching the touch screen 28 at an appropriate touch key 30 or by pressing an appropriate push button 26 on the button panel. The touch keys 30 may be used to implement the same functions as push buttons 26. Alternatively, the push buttons 26 may provide inputs for one aspect of operating the game, while the touch keys 30 may allow for input needed for another aspect of the game.

The various components of the gaming machine 10 may be connected directly to, or contained within, the housing 12, as seen in FIG. 1*a*, or may be located outboard of the housing 12 and connected to the housing 12 via a variety of different wired or wireless connection methods. Thus, the gaming machine 10 comprises these components whether housed in the housing 12, or outboard of the housing 12 and connected remotely.

The operation of the basic wagering game is displayed to the player on the primary display 14. The primary display 14 can also display the bonus game associated with the basic wagering game. The primary display 14 of the gaming machine 10 may include a number of mechanical reels to display the outcome in visual association with at least one payline 32. Alternatively, the primary display 14 may take the form of a hybrid display incorporating both electromechanical display components, such as reels, with an electronic display, which may include a cathode ray tube (CRT), a high resolution LCD, a plasma display, an LED, or any other type of display suitable for use in the gaming machine 10. As shown, the primary display 14 includes the touch screen 28 overlaying the entire display (or a portion thereof) to allow players to make game-related selections. In the illustrated embodiment, the gaming machine 10 is an "upright" version in which the primary display 14 is oriented vertically relative to the player. Alternatively, the gaming machine may be a "slant-top" version in which the primary display 14 is slanted at about a thirty-degree angle toward the player of the gaming machine 10.

A player begins play of the basic wagering game by making a wager via the value input device 18 of the gaming machine 10. A player can select play by using the player input device 24, via the buttons 26 or the touch screen keys 30. The basic game consists of a plurality of symbols arranged in an array, and includes at least one payline 32 that indicates one or more outcomes of the basic game. Such outcomes are randomly selected in response to the wagering input by the player. At least one of the plurality of randomly-selected outcomes may be a start-bonus outcome, which can include any variations of symbols or symbol combinations triggering a bonus game.

In some embodiments, the gaming machine 10 may also include a player information reader 52 that allows for identification of a player by reading a card with information indicating his or her true identity. The player information reader 52 is shown in FIG. 1*a* as a card reader, but may take on many forms including a ticket reader, bar code scanner, RFID transceiver or computer readable storage medium interface. Currently, identification is generally used by casinos for rewarding certain players with complimentary services or special offers. For example, a player may be enrolled in the gaming establishment's loyalty club and may be awarded certain complimentary services as that player collects points in his or her player-tracking account. The player inserts his or her card into the player information reader 52, which allows the casino's computers to register that player's wagering at the gaming machine 10. The gaming machine 10 may use the secondary display 16 or other dedicated player-tracking display for providing the player with information about his or her account or other player-specific information. Also, in some embodiments, the information reader 52 may be used to restore game assets that the player achieved and saved during a previous game session.

Figure 1B:
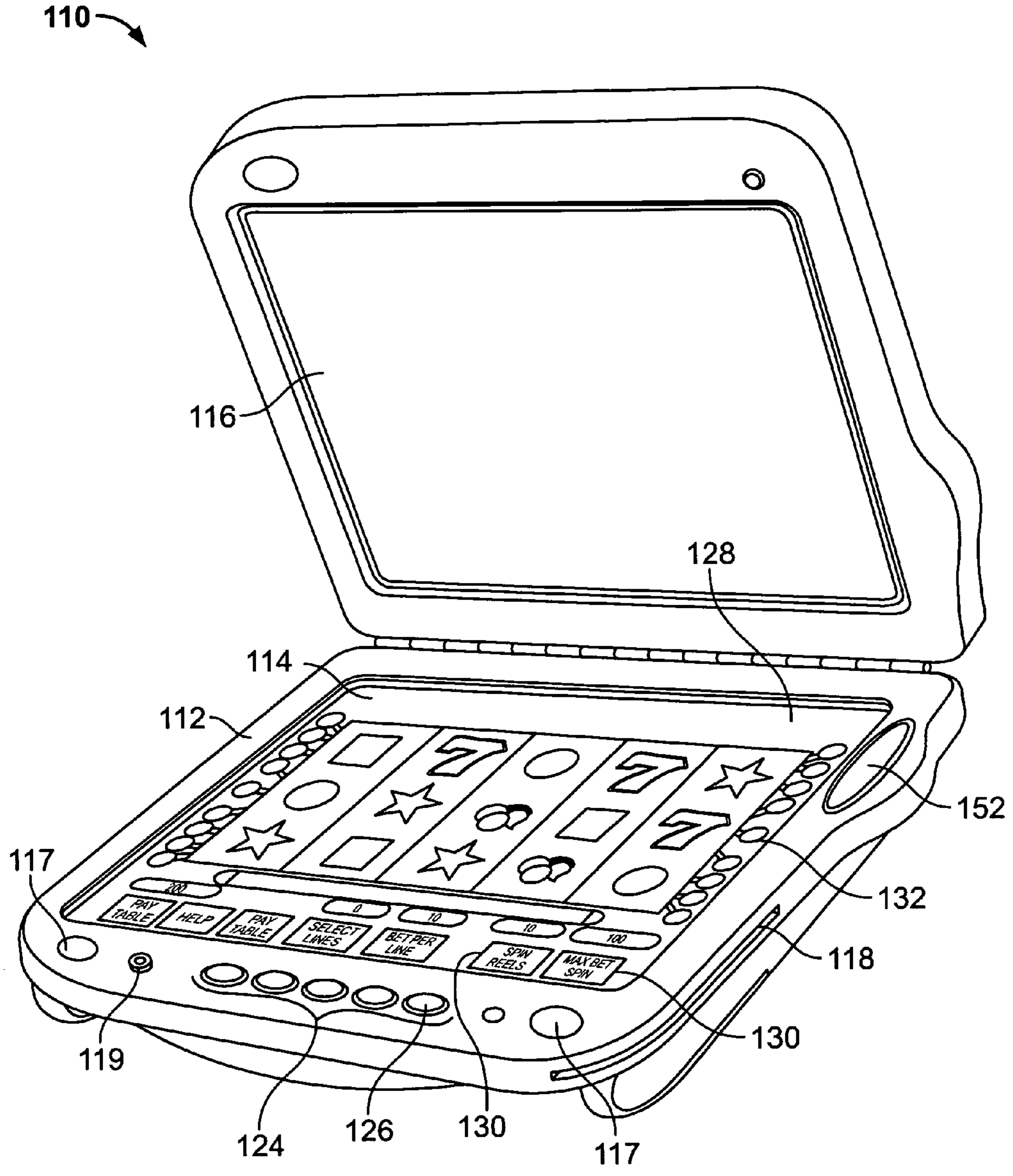
FIG. 1*b* is a perspective view of a handheld gaming machine embodying the present invention.

Depicted in FIG. 1*b* is a handheld or mobile gaming machine 110. Like the free standing gaming machine 10, the handheld gaming machine 110 is preferably an electromechanical gaming machine configured to play mechanical slots, any other game compatible with a display comprising at least one symbol-bearing reel strip. The handheld gaming machine 110 may also be a hybrid gaming machine integrating both electronic and electromechanical displays. The handheld gaming machine 110 comprises a housing or casing 112 and includes input devices, including a value input device 118 and a player input device 124. For output the handheld gaming machine 110 includes, but is not limited to, a primary display 114, a secondary display 116, one or more speakers 117, one or more player-accessible ports 119 (e.g., an audio output jack for headphones, a video headset jack, etc.), and other conventional I/O devices and ports, which may or may not be player-accessible. In the embodiment depicted in FIG. 1*b*, the handheld gaming machine 110 comprises a secondary display 116 that is rotatable relative to the primary display 114. The optional secondary display 116 may be fixed, movable, and/or detachable/attachable relative to the primary display 114. Either the primary display 114 and/or secondary display 116 may be configured to display any aspect of a non-wagering game, wagering game, secondary games, bonus games, progressive wagering games, group games, shared-experience games or events, game events, game outcomes, scrolling information, text messaging, emails, alerts or announcements, broadcast information, subscription information, and handheld gaming machine status.

The player-accessible value input device 118 may comprise, for example, a slot located on the front, side, or top of the casing 112 configured to receive credit from a stored-value card (e.g., casino card, smart card, debit card, credit card, etc.) inserted by a player. In another aspect, the player-accessible value input device 118 may comprise a sensor (e.g., an RF sensor) configured to sense a signal (e.g., an RF signal) output by a transmitter (e.g., an RF transmitter) carried by a player. The player-accessible value input device 118 may also or alternatively include a ticket reader, or barcode scanner, for reading information stored on a credit ticket, a card, or other tangible portable credit or funds storage device. The credit ticket or card may also authorize access to a central account, which can transfer money to the handheld gaming machine 110.

Still other player-accessible value input devices 118 may require the use of touch keys 130 on the touch-screen display (e.g., primary display 114 and/or secondary display 116) or player input devices 124. Upon entry of player identification information and, preferably, secondary authorization information (e.g., a password, PIN number, stored value card number, predefined key sequences, etc.), the player may be permitted to access a player's account. As one potential optional security feature, the handheld gaming machine 110 may be configured to permit a player to only access an account the player has specifically set up for the handheld gaming machine 110. Other conventional security features may also be utilized to, for example, prevent unauthorized access to a player's account, to minimize an impact of any unauthorized access to a player's account, or to prevent unauthorized access to any personal information or funds temporarily stored on the handheld gaming machine 110.

The player-accessible value input device 118 may itself comprise or utilize a biometric player information reader which permits the player to access available funds on a player's account, either alone or in combination with another of the aforementioned player-accessible value input devices 118. In an embodiment wherein the player-accessible value input device 118 comprises a biometric player information reader, transactions such as an input of value to the handheld device, a transfer of value from one player account or source to an account associated with the handheld gaming machine 110, or the execution of another transaction, for example, could all be authorized by a biometric reading, which could comprise a plurality of biometric readings, from the biometric device.

Alternatively, to enhance security, a transaction may be optionally enabled only by a two-step process in which a secondary source confirms the identity indicated by a primary source. For example, a player-accessible value input device 118 comprising a biometric player information reader may require a confirmatory entry from another biometric player information reader 152, or from another source, such as a credit card, debit card, player ID card, fob key, PIN number, password, hotel room key, etc. Thus, a transaction may be enabled by, for example, a combination of the personal identification input (e.g., biometric input) with a secret PIN number, or a combination of a biometric input with a fob input, or a combination of a fob input with a PIN number, or a combination of a credit card input with a biometric input. Essentially, any two independent sources of identity, one of which is secure or personal to the player (e.g., biometric readings, PIN number, password, etc.) could be utilized to provide enhanced security prior to the electronic transfer of any funds. In another aspect, the value input device 118 may be provided remotely from the handheld gaming machine 110.

The player input device 124 comprises a plurality of push buttons on a button panel for operating the handheld gaming machine 110. In addition, or alternatively, the player input device 124 may comprise a touch screen 128 mounted to a primary display 114 and/or secondary display 116. In one aspect, the touch screen 128 is matched to a display screen having one or more selectable touch keys 130 selectable by a user's touching of the associated area of the screen using a finger or a tool, such as a stylus pointer. A player enables a desired function either by touching the touch screen 128 at an appropriate touch key 130 or by pressing an appropriate push button 126 on the button panel. The touch keys 130 may be used to implement the same functions as push buttons 126. Alternatively, the push buttons 126 may provide inputs for one aspect of the operating the game, while the touch keys 130 may allow for input needed for another aspect of the game. The various components of the handheld gaming machine 110 may be connected directly to, or contained within, the casing 112, as seen in FIG. 1*b*, or may be located outboard of the casing 112 and connected to the casing 112 via a variety of hardwired (tethered) or wireless connection methods. Thus, the handheld gaming machine 110 may comprise a single unit or a plurality of interconnected parts (e.g., wireless connections) which may be arranged to suit a player's preferences.

The operation of the basic wagering game on the handheld gaming machine 110 is displayed to the player on the primary display 114. The primary display 114 can also display the bonus game associated with the basic wagering game. The primary display 114 preferably includes a number of mechanical reels to display the outcome in visual association with at least one payline. Alternatively, the primary display 114 may take the form of a hybrid display incorporating both electromechanical display components, such as reels, with an electronic display, which may include a high resolution LCD, a plasma display, an LED, or any other type of display suitable for use in the handheld gaming machine 110. The size of the primary display 114 may vary from, for example, about a 2-3" display to a 15" or 17" display. In at least some aspects, the primary display 114 is a 7"-10" display. As the weight of and/or power requirements of such displays decreases with improvements in technology, it is envisaged that the size of the primary display may be increased. Optionally, coatings or removable films or sheets may be applied to the display to provide desired characteristics (e.g., anti-scratch, anti-glare, bacterially-resistant and anti-microbial films, etc.). In at least some embodiments, the primary display 114 and/or secondary display 116 may have a 16:9 aspect ratio or other aspect ratio (e.g., 4:3). The primary display 114 and/or secondary display 116 may also each have different resolutions, different color schemes, and different aspect ratios.

As with the free standing gaming machine 10, a player begins play of the basic wagering game on the handheld gaming machine 110 by making a wager (e.g., via the value input device 118 or an assignment of credits stored on the handheld gaming machine via the player input device 124, e.g. the touch screen keys 130 or push buttons 126) on the handheld gaming machine 110. In at least some aspects, the basic game may comprise a plurality of symbols arranged in an array, and includes at least one payline 132 that indicates one or more outcomes of the basic game. Such outcomes are randomly selected in response to the wagering input by the player. At least one of the plurality of randomly selected outcomes may be a start-bonus outcome, which can include any variations of symbols or symbol combinations triggering a bonus game.

In some embodiments, the player-accessible value input device 118 of the handheld gaming machine 110 may double as a player information reader 152 that allows for identification of a player by reading a card with information indicating the player's identity (e.g., reading a player's credit card, player ID card, smart card, etc.). The player information reader 152 may alternatively or also comprise a bar code scanner, RFID transceiver or computer readable storage medium interface. In one presently preferred aspect, the player information reader 152, shown by way of example in FIG. 1*b*, comprises a biometric sensing device.

Figure 2:
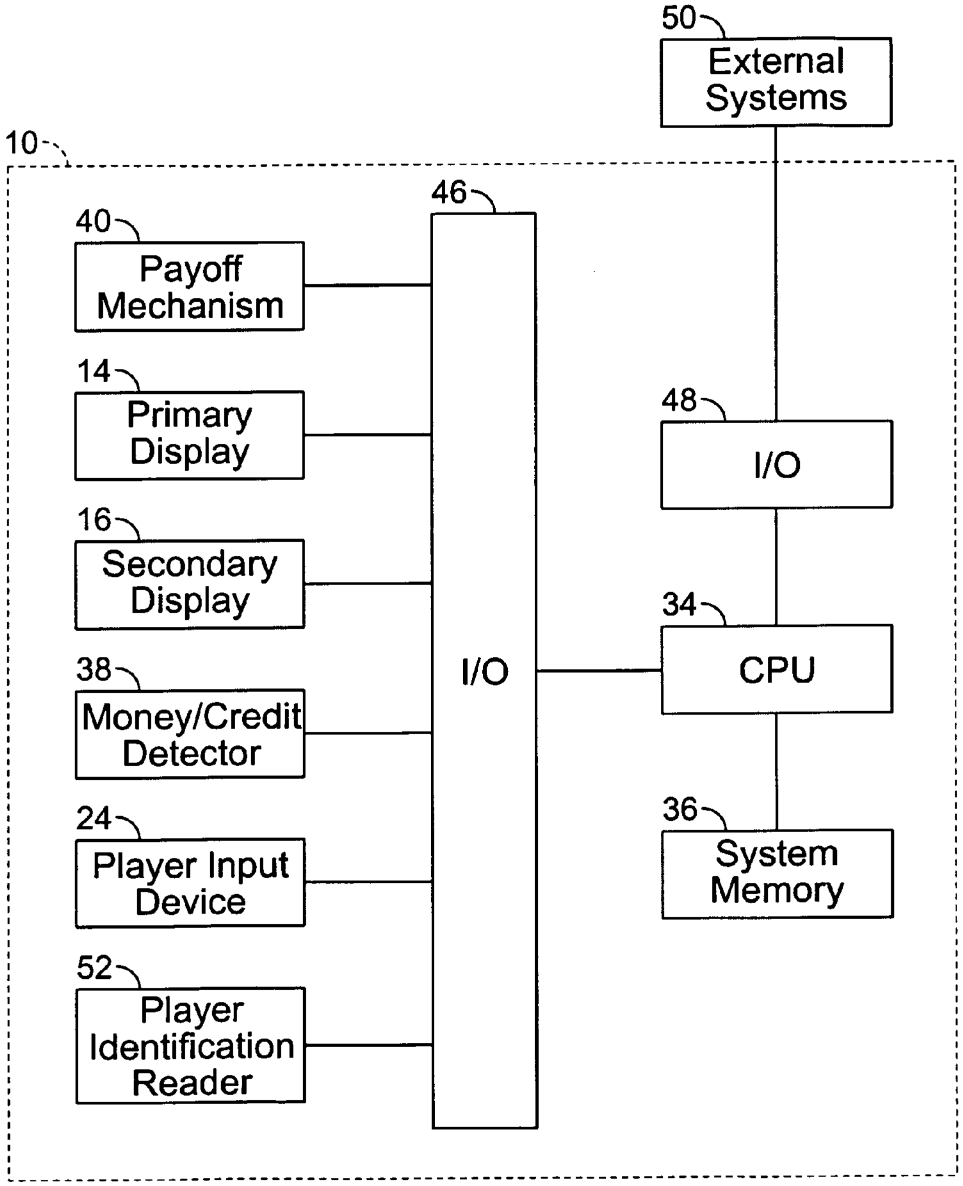
FIG. 2 is a block diagram of a control system suitable for operating the gaming machines of FIGS. 1*a* and 1*b;*

Turning now to FIG. 2, the various components of the gaming machine 10 are controlled by a central processing unit (CPU) 34, also referred to herein as a controller or processor (such as a microcontroller or microprocessor). To provide gaming functions, the controller 34 executes one or more game programs stored in a computer readable storage medium, in the form of memory 36. The controller 34 performs the random selection (using a random number generator (RNG)) of an outcome from the plurality of possible outcomes of the wagering game. Alternatively, the random event may be determined at a remote controller. The remote controller may use either an RNG or pooling scheme for its central determination of a game outcome. It should be appreciated that the controller 34 may include one or more microprocessors, including but not limited to a master processor, a slave processor, and a secondary or parallel processor.

The controller 34 is also coupled to the system memory 36 and a money/credit detector 38. The system memory 36 may comprise a volatile memory (e.g., a random-access memory (RAM)) and a non-volatile memory (e.g., an EEPROM). The system memory 36 may include multiple RAM and multiple program memories. The money/credit detector 38 signals the processor that money and/or credits have been input via the value input device 18. Preferably, these components are located within the housing 12 of the gaming machine 10. However, as explained above, these components may be located outboard of the housing 12 and connected to the remainder of the components of the gaming machine 10 via a variety of different wired or wireless connection methods.

As seen in FIG. 2, the controller 34 is also connected to, and controls, the primary display 14, the player input device 24, and a payoff mechanism 40. The payoff mechanism 40 is operable in response to instructions from the controller 34 to award a payoff to the player in response to certain winning outcomes that might occur in the basic game or the bonus game(s). The payoff may be provided in the form of points, bills, tickets, coupons, cards, etc. For example, in FIG. 1*a*, the payoff mechanism 40 includes both a ticket printer 42 and a coin outlet 44. However, any of a variety of payoff mechanisms 40 well known in the art may be implemented, including cards, coins, tickets, smartcards, cash, etc. The payoff amounts distributed by the payoff mechanism 40 are determined by one or more pay tables stored in the system memory 36.

Communications between the controller 34 and both the peripheral components of the gaming machine 10 and external systems 50 occur through input/output (I/O) circuits 46, 48. More specifically, the controller 34 controls and receives inputs from the peripheral components of the gaming machine 10 through the input/output circuits 46. Further, the controller 34 communicates with the external systems 50 via the I/O circuits 48 and a communication path (e.g., serial, parallel, IR, RC, 10bT, etc.). The external systems 50 may include a gaming network, other gaming machines, a gaming server, communications hardware, or a variety of other interfaced systems or components. Although the I/O circuits 46, 48 may be shown as a single block, it should be appreciated that each of the I/O circuits 46, 48 may include a number of different types of I/O circuits.

Controller 34, as used herein, comprises any combination of hardware, software, and/or firmware that may be disposed or resident inside and/or outside of the gaming machine 10 that may communicate with and/or control the transfer of data between the gaming machine 10 and a bus, another computer, processor, or device and/or a service and/or a network. The controller 34 may comprise one or more controllers or processors. In FIG. 2, the controller 34 in the gaming machine 10 is depicted as comprising a CPU, but the controller 34 may alternatively comprise a CPU in combination with other components, such as the I/O circuits 46, 48 and the system memory 36. The controller 34 may reside partially or entirely inside or outside of the machine 10. The control system for a handheld gaming machine 110 may be similar to the control system for the free standing gaming machine 10 except that the functionality of the respective on-board controllers may vary.

The gaming machines 10,110 may communicate with external systems 50 (in a wired or wireless manner) such that each machine operates as a "thin client," having relatively less functionality, a "thick client," having relatively more functionality, or through any range of functionality there between. As a generally "thin client," the gaming machine may operate primarily as a display device to display the results of gaming outcomes processed externally, for example, on a server as part of the external systems 50. In this "thin client" configuration, the server executes game code and determines game outcomes (e.g., with a random number generator), while the controller 34 on board the gaming machine processes display information to be displayed on the display(s) of the machine. In an alternative "thicker client" configuration, the server determines game outcomes, while the controller 34 on board the gaming machine executes game code and processes display information to be displayed on the display(s) of the machines. In yet another alternative "thick client" configuration, the controller 34 on board the gaming machine 110 executes game code, determines game outcomes, and processes display information to be displayed on the display(s) of the machine. Numerous alternative configurations are possible such that the aforementioned and other functions may be performed onboard or external to the gaming machine as may be necessary for particular applications. It should be understood that the gaming machines 10,110 may take on a wide variety of forms such as a free standing machine, a portable or handheld device primarily used for gaming, a mobile telecommunications device such as a mobile telephone or personal daily assistant (PDA), a counter top or bar top gaming machine, or other personal electronic device such as a portable television, MP3 player, entertainment device, etc.

Figure 3:
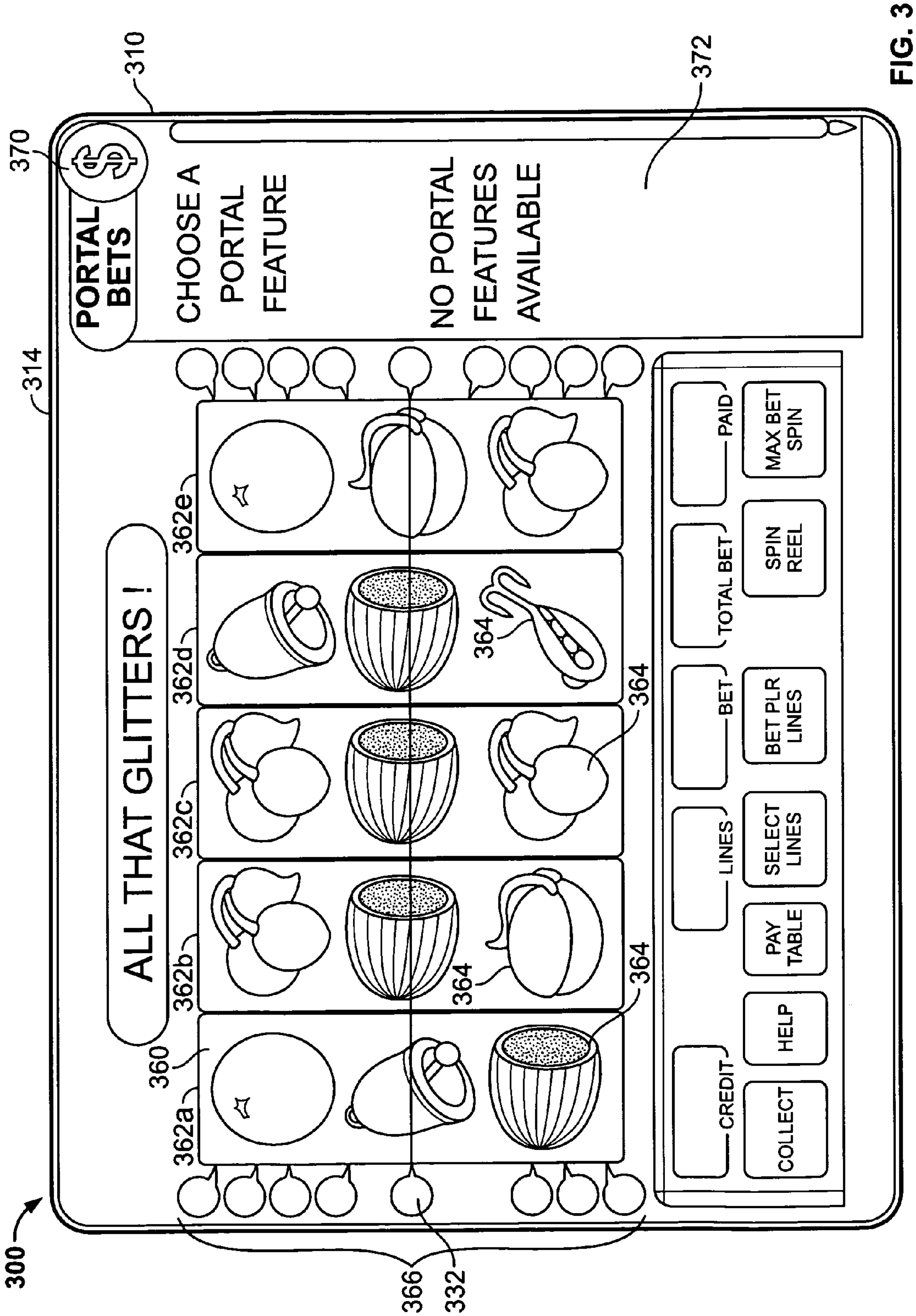
FIG. 3 is a screen shot of a primary display of a gaming system displaying a primary wagering game and a supplemental feature menu.

Turning now to FIG. 3, a primary display 314 of a first gaming device 310 of a gaming system 300 is shown. The primary display 314 may be any form of display such as those described herein with reference to the free standing and handheld gaming devices of FIGS. 1*a* and 1*b*. The primary display 314 includes a display of a primary wagering game 360, which in this embodiment is a slot game entitled "All That Glitters" as shown in FIG. 3. The slot game 360 includes a plurality of reels 362*a,b,c,d,e* which may be either electromechanical reels or simulations thereof on the primary display 314. The reels 362*a,b,c,d,e* include a plurality of symbols 364 displayed thereon that vary as the reels 362*a,b,c,d,e* are spun and stopped. The symbols 364 may include any variety of graphical symbols, elements, or representations, including symbols 364 which are associated with one or more themes of the gaming machine or system. The symbols 364 may also include a blank symbol or empty space. As described herein the symbols 364 landing on the active paylines 332 (the paylines for which a wager has been received) are evaluated for winning combinations. If a winning combination of symbols 364 lands on an active payline 332 a primary award is awarded in accordance with a pay table of the gaming device. The symbols 364 on the reels 362*a,b,c,d,e* form an array 366 or matrix of symbols 364, having a number of rows and columns, which in the embodiment shown is three rows and five columns. In alternate embodiments, the array 366 may have greater or fewer symbols 364, and may take on a variety of different forms having greater or fewer rows and/or columns. The array 366 may even comprise other non-rectangular forms or arrangements of symbols 364.

The system 300 further includes a feature icon 370 for displaying and receiving selection and activation of various supplemental features to the wagering game 360. The feature icon 370 in FIG. 3 comprises a graphical icon or button entitled "Portal Bets." In other embodiments, other icons or graphics may be utilized, and may include isolated buttons, icons, or even a graphical bar or menu, for example across the top, bottom, or side of the display 314. The feature icon 370 can be selected or activated by a player of the wagering game 360 through a touch screen 328 overlying the display 314, or through any other appropriate player input device as described herein with relation to FIGS. 1*a*, 1*b*, and 2.

As seen in FIG. 3, once the feature icon 370 has been selected or activated, a feature menu 372 is displayed on the primary display 314 of the system 300. The feature menu 372 includes and displays a plurality of available features which are provided for activation or selection in addition to the primary wagering game 360. In FIG. 3, no features have yet been activated by an operator of the gaming system 300, and thus the feature menu 372 displays the message "No Portal Features Available." Once one or more supplemental features are activated by an operator, as described herein, they will appear on the feature menu 372. In an embodiment, if no portal features were activated or available, the feature icon 370 may be completely removed or absent from the primary display 314.

Once activated, as described herein, the features available on the feature menu 372 may take on many different forms, and are available to players in addition to one or more basic wagering games 360 of the system 300. Any number of wagering-game features may be made available to be activated by a player of the gaming system 300. The features may include any number of improvements, additions, enhancements, or modifications of a standard basic wagering game experience displayed on the primary display 314. For example, the features may include eligibility or participation in bonus games, progressive jackpots or awards, or community games or events, including group games, team competitions, and competitive or collaborative play. The features may also include wagering game assets such as free spins, wild symbols, multipliers, symbol upgrades, expanding wild symbols, scatter symbols, etc. The features may also include eligibility or participation in secondary wagering games, side-bet games, reel re-spins, or extra chances or opportunities during play of the primary wagering games.

In other embodiments, the features that may be activated may include features usable in a selection game, such as additional selections, opportunities to replace or re-do a prior selection, opportunities to undo a poor selection or selection of a terminating symbol, etc. Moreover, the features may include eligibility or participation in enhanced awards, improvements of randomly selected outcomes of a primary wagering game, advancement to higher levels of play, advancement to newer or more favorable episodes of wagering games, etc. In yet other embodiments, features may include eligibility and participation in additional wagering games, other games within a casino or gaming establishment (e.g., other table games or electronic games), wide area progressive jackpots, local area progressive jackpots, tangible prize awards, player reward points and loyalty programs, etc. The features of the gaming system 300 as described herein may comprise any feature available on a wagering game which may be funded by an increased wager, a side wager, a secondary or separate wager, via player reward points, or in any other manner utilizing any form of currency, monetary input or other value.

It should also be understood that the features activated in the system 300 of the present invention may be any number of available wagering game features as described herein. Moreover, the features may include any enhancements or additions to the primary wagering game as described in detail in U.S. Patent Application Ser. No. 60/844,032 filed on Sep. 12, 2006, and US. Patent Application Ser. No. 60/802,984 filed on May 24, 2006, both of which are assigned to WMS Gaming Inc. Both such applications are hereby incorporated by reference, in their entirety, as if full set forth herein.

Figure 4:
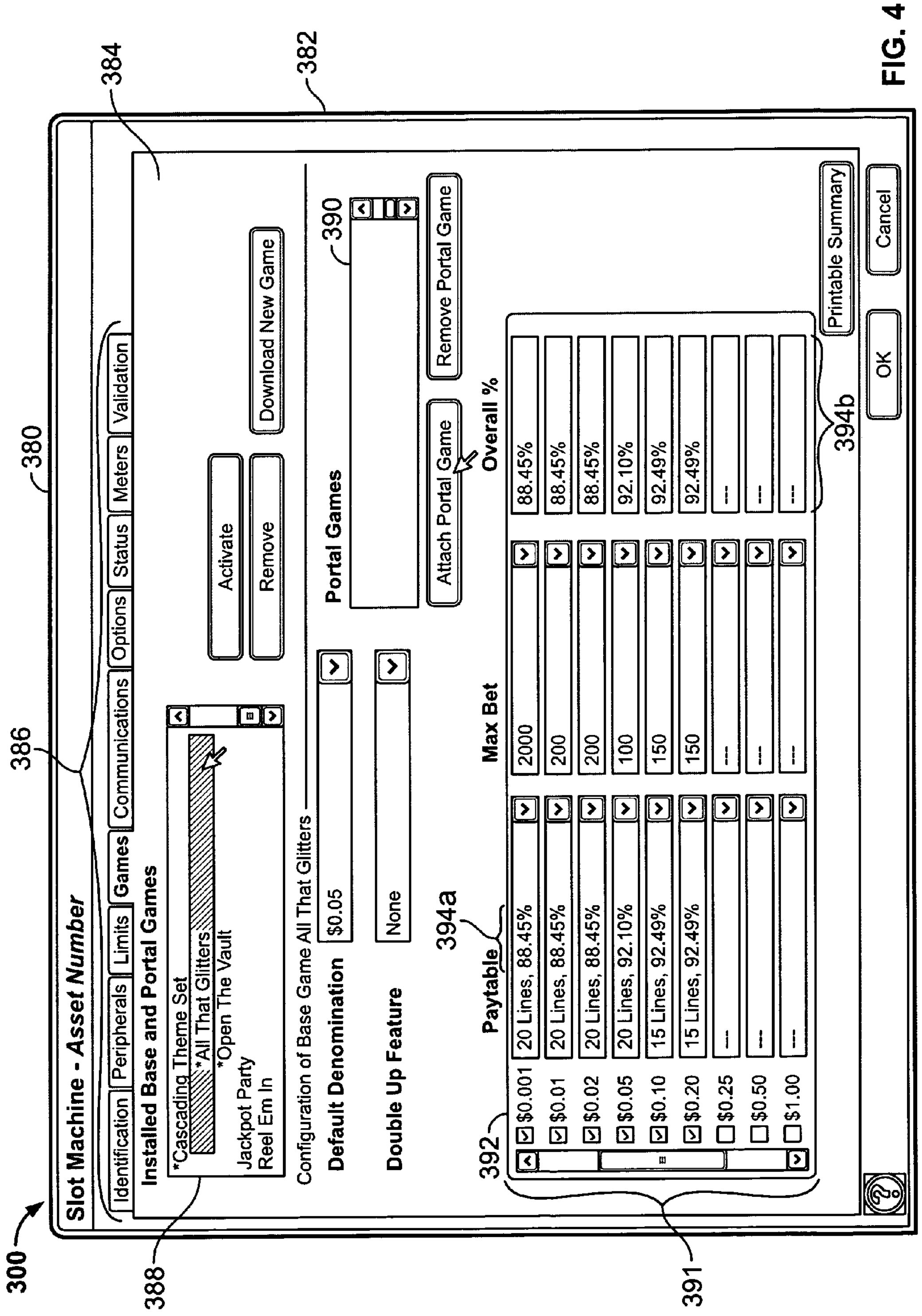
FIG. 4 is a screen shot of a control terminal for configuring supplemental features for use with one or more primary wagering games.

Turning to FIG. 4, an operator display 380 of the gaming system 300 is depicted. The operator display 380 includes a plurality of configuration screens for configuring the primary wagering game 360 displayed on the first gaming device 310, and for configuring other wagering games displayed on other gaming devices throughout the operator's establishment, for example, a casino. In an embodiment, the operator display 380 is in communication with, and forms part of, an operator control terminal 382 through which one or more gaming functions of the operator's establishment are controlled. The operator control terminal 382 may be in communication with one or more servers, utilizing wired and/or wireless network communications. The network may in turn be connected to other servers, gaming devices, computers, and control systems. The operator control terminal 382 includes one or more input devices, such as a touch screen overlying the display 380, a mouse, and a keyboard, for receiving inputs from the operator to control the wagering games within the operator's establishment.

In FIG. 4, a control screen 384 is displayed on the operator display 380. The control screen 384 includes a plurality of categories 386 corresponding to attributes of the wagering games in the operator's facility which the operator can customize or control. For example, the categories 386 include Peripherals (for controlling peripherals in communication with the gaming devices, such as printers and bill validators), Limits (for controlling denominations of various gaming devices), and Communications (for controlling communications between and among gaming devices and other devices). One of the categories 386 is a Games category for controlling, customizing and setting up wagering games, and supplemental wagering game features (such as those discussed with reference to FIG. 3).

As seen in FIG. 4, the control screen 384 includes a list of the primary wagering games and supplemental features installed and available on the system 300, displayed in the "Installed Base and Portal Games" window 388. As used herein the term "theme" or "themes" is used to signify one or more of the base games, also referred to as "primary wagering games," such as the one displayed in FIG. 3. "Portal games" refers to, and may be utilized interchangeably with the words "supplemental features," and signifies one or more supplemental features, games, or activities in which a player may participate in addition to playing one of the primary wagering games.

In FIG. 4, one of the themes listed in the Installed Base and Portal Games window 388 is All That Glitters, which is the primary wagering game 360 active on the gaming device 310 in FIG. 3. An operator has selected the primary wagering game 360 "All That Glitters" by clicking on it with a mouse, such that the "All That Glitters" theme is highlighted in the list in the window 388. The configuration corresponding to the selected theme 360 appears on the middle and lower portions of the control screen 384, as indicated by the message in the middle of the control screen 384 indicating "Configuration of Base Game All That Glitters." This message serves to notify the operator as to what he or she is configuring. Such configuration includes a Portal Games window 390 located on the control screen 384. The Portal Games window 390 lists any installed supplemental features (such as those supplemental features described with reference to FIG. 3). In FIG. 4, no Portal Games 390 are yet activated or associated with the "All That Glitters" theme 360, as shown by the blank Portal Games window 390.

At the lower portion of the control screen 384, a theme configuration table 392 for the "All That Glitters" theme 360 is displayed, showing a plurality of different denominations 391 available for play on the game 360, as well as the number of paylines, the payback percentage, and the maximum bet for each denomination 391. The number of lines signifies the maximum available number of paylines for the game 360. The Max Bet sets the maximum primary wager which can be placed on a single play of the primary wagering game 360. The theme configuration table 392 includes a Primary Payback Percentage 394*a* for the basic wagering game "All That Glitters" (by denomination), as well as an Overall Payback Percentage 394*b* of the wagering game 360 taking into consideration any portal features which have been activated. Because no Portal Games have been activated, the Overall Payback Percentage 394*b* and the Primary Payback Percentage 394*a* are the same for each denomination 391. The theme configuration table 392 includes a plurality of pull down selectors for customizing the selections for each of the fields within the table 392, thereby allowing the operator to select from a plurality of available choices in each field.

As used herein, a "payback percentage" refers to one or more numbers which signify a theoretical mathematical value associated with a gaming device or system indicating a theoretical percentage or proportion of wagers which will be either returned to players via awards or retained by an operator of the gaming device or system. One example of a payback percentage is referred to as a "payout percentage" or "paytable percentage" which is a theoretical average percentage of all wagers input into a gaming device or system which are returned or dispensed to players in the form of awards. Another example is a "hold percentage" which is the theoretical average percentage of all wagers input into a gaming device or system that are held, earned or retained by an operator of the gaming device or system. A payout percentage and a hold percentage are related in that they sum to 100%. For example, if a gaming device has a 95% payout percentage, it will have a 5% hold percentage. This means that over many plays of wagering games on the gaming device, a theoretical 95% of all wagers input into the device will be dispensed or returned to players in the form of one or more awards. Likewise, a theoretical 5% of all wagers input into the device will be retained by the operator. A "payback percentage" as used herein can be a payout percentage, a hold percentage, or any other number or index which indicates or provides information relating to mathematical probabilities and theoretical expectations as to what portion of wagers input into a gaming system will be returned and/or what portion will be retained or held.

Figure 5:
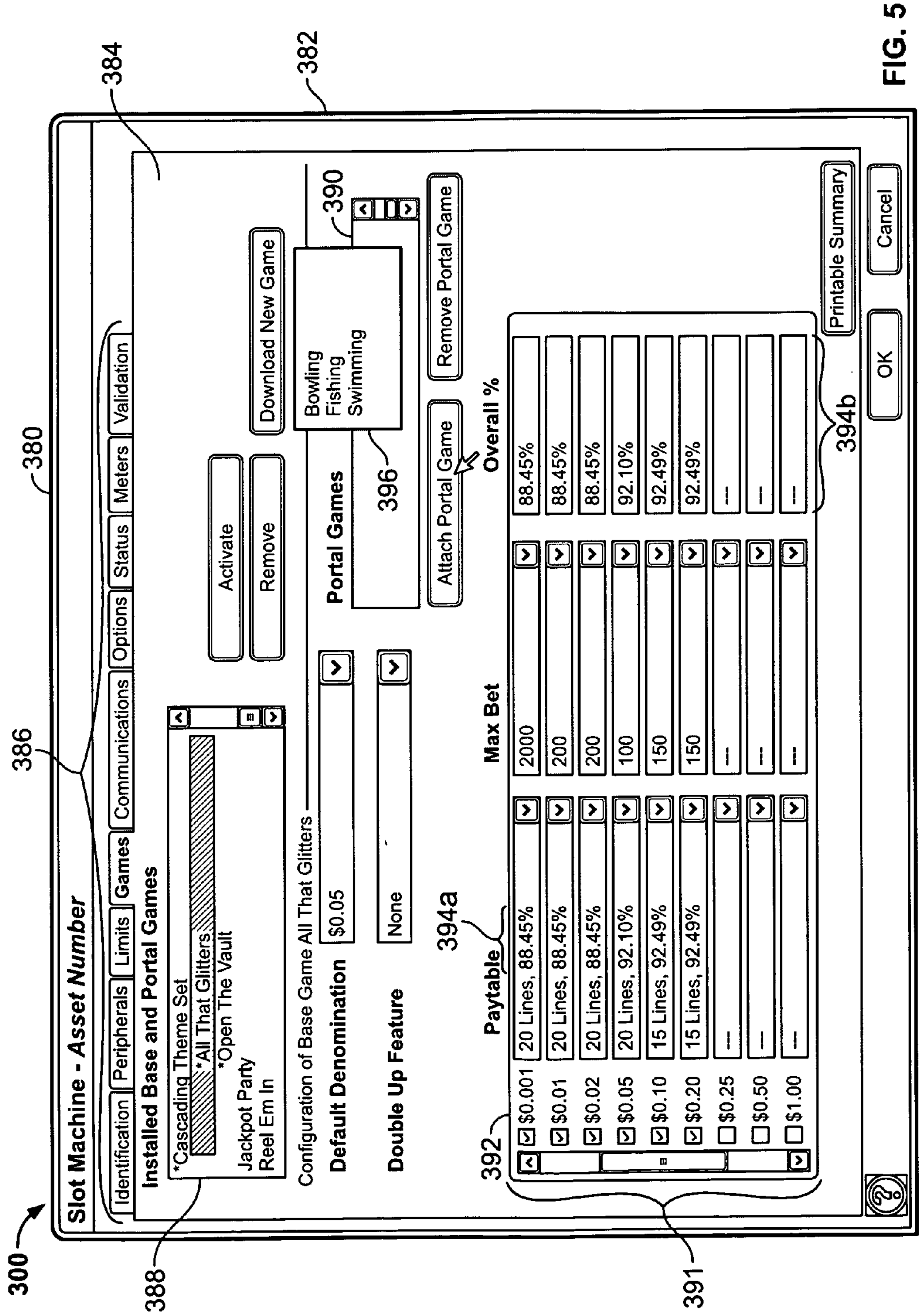
FIG. 5 is a screen shot of the control terminal of FIG. 4, showing an operator activating a supplemental feature.

Turning to FIG. 5, the control screen 384 is shown with the operator using the mouse (see mouse pointer) to select the "Attach Portal Games" button. A pop up window 396 appears listing a plurality of available Portal Games, which include Bowling, Fishing and Swimming. The list inside the pop up window 396 is populated by Portal Games which have been installed on the system 300 by the operator and made available for use. In the Installed Base and Portal Games window 388, "All That Glitters" remains highlighted to signify that the operator is configuring one or more Portal Games which will be activated, associated with, and made available for play during play of the theme "All That Glitters." In an alternative embodiment, the Portal Games listed in the pop up window 396 may or may not already be installed. For example, the list may include Portal Games which are either already installed or available for download and installation. Thus, if a Portal Game is on the list, but not yet installed, it could be immediately downloaded and installed if selected by the operator.

Figure 6:
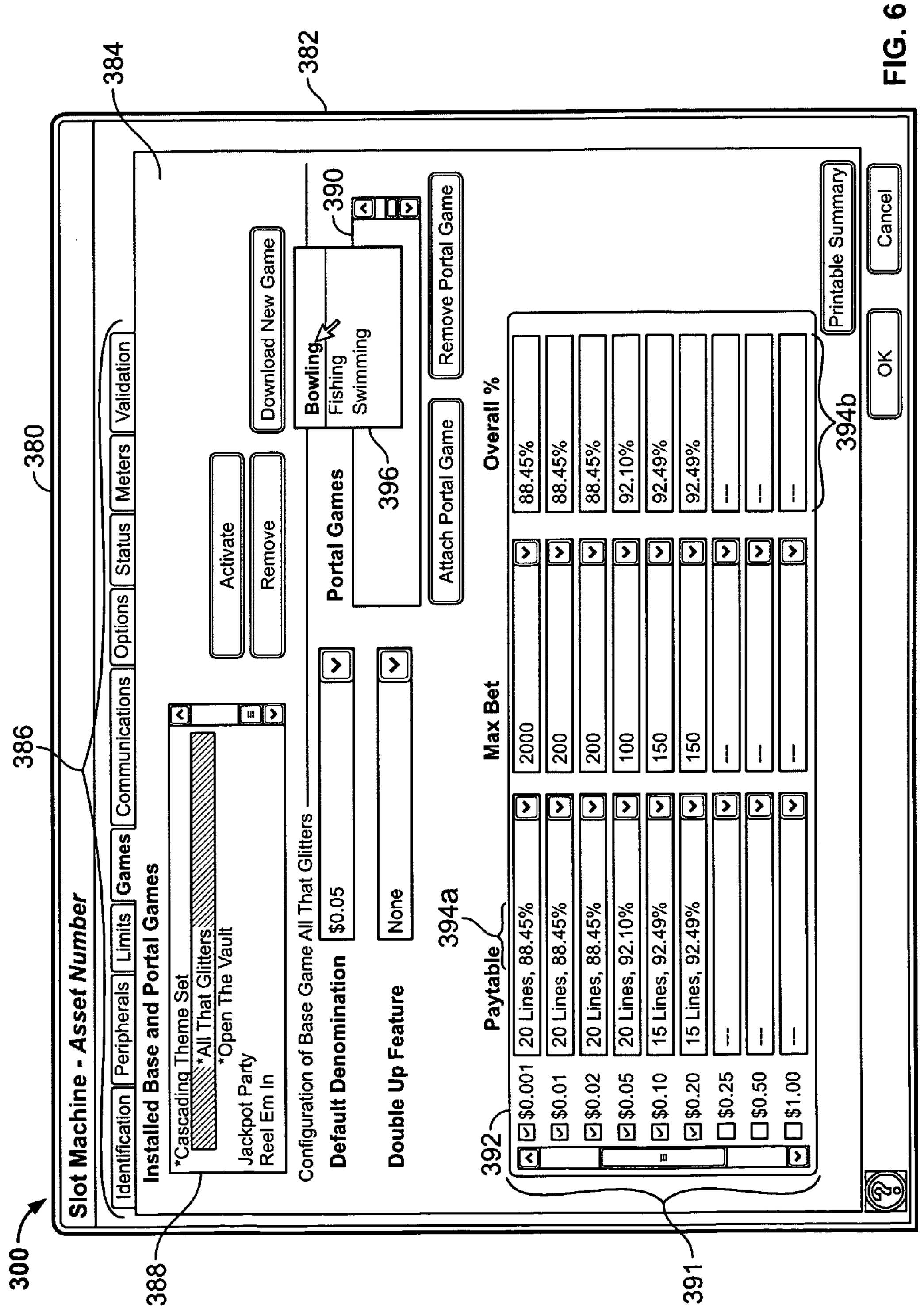
FIG. 6 is a further screen shot of the control terminal of FIG. 4, showing an operator selecting a supplemental feature for activation.
Figure 7:
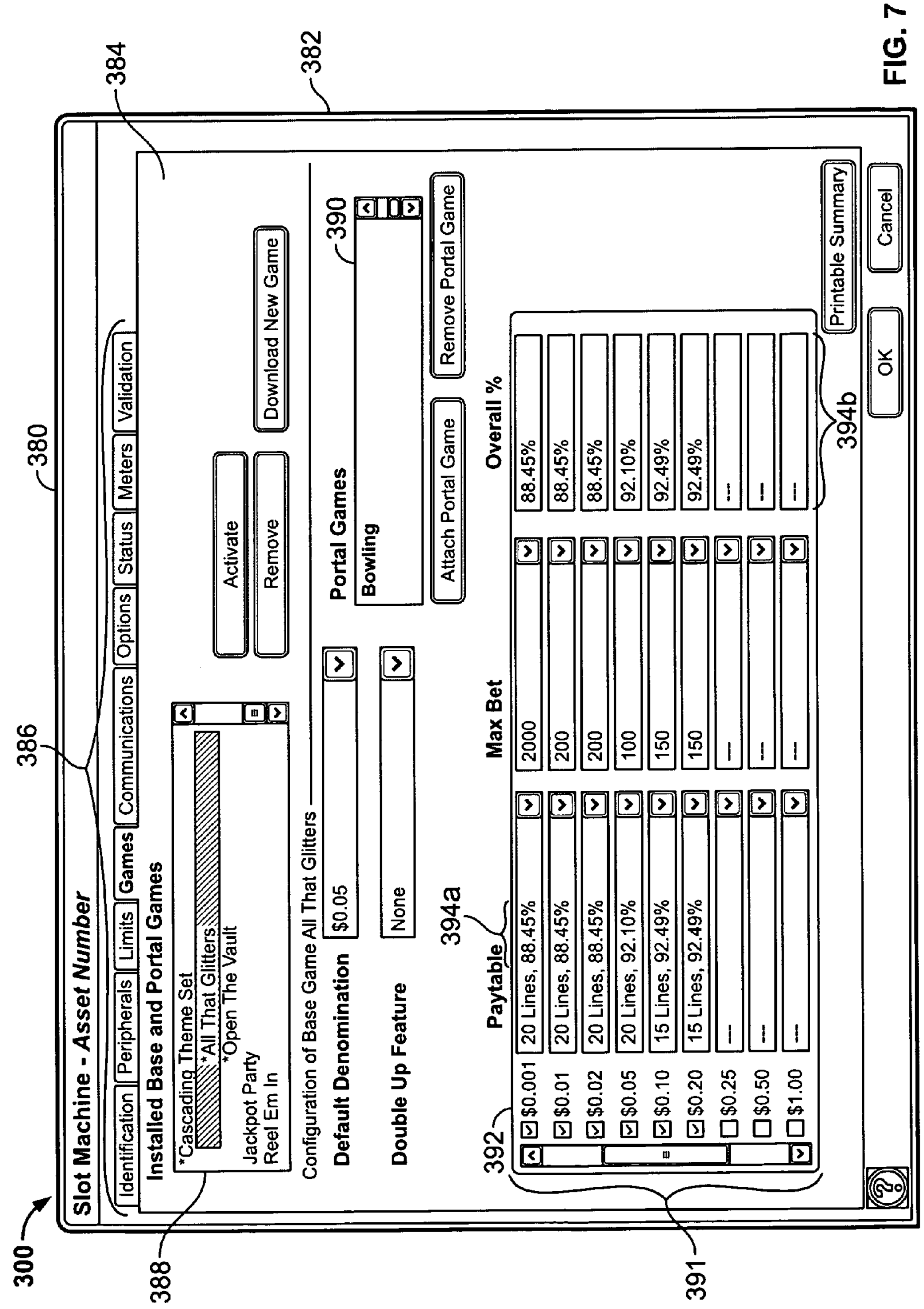
FIG. 7 is another screen shot of the control terminal of FIG. 4, showing an activated supplemental feature.

In FIG. 6, the control screen 384 shows the operator using the mouse to select "Bowling" from the list of available Portal Games in the pop up window 396. Thus, by making this selection, the Bowling feature becomes activated (after being configured as described herein) and associated with the primary wagering game 360 theme "All That Glitters." In an embodiment, the feature has a default configuration to become immediately activated. In an alternative embodiment, the feature does not become activated until configured as described herein. In FIG. 7, once the selection has been made, "Bowling" appears in the list of Portal Games 390, and the pop window 396 disappears, as seen on the control screen 384. This signifies that the Bowling feature has now been activated for use on gaming devices which execute and display the primary wagering game 360 of the associated theme "All That Glitters." Therefore, throughout the operator's establishment, gaming devices displaying "All That Glitters" primary wagering games 360 will now have the Bowling feature available for selection and play, as described further herein. The control screen 384 further includes a "Remove Portal Game" button which the operator may use to remove or disassociate portal games from the selected theme 360. Thus, the control screen 384 provides the operator an interface for adding and removing portal games to primary wagering game themes.

Figure 8:
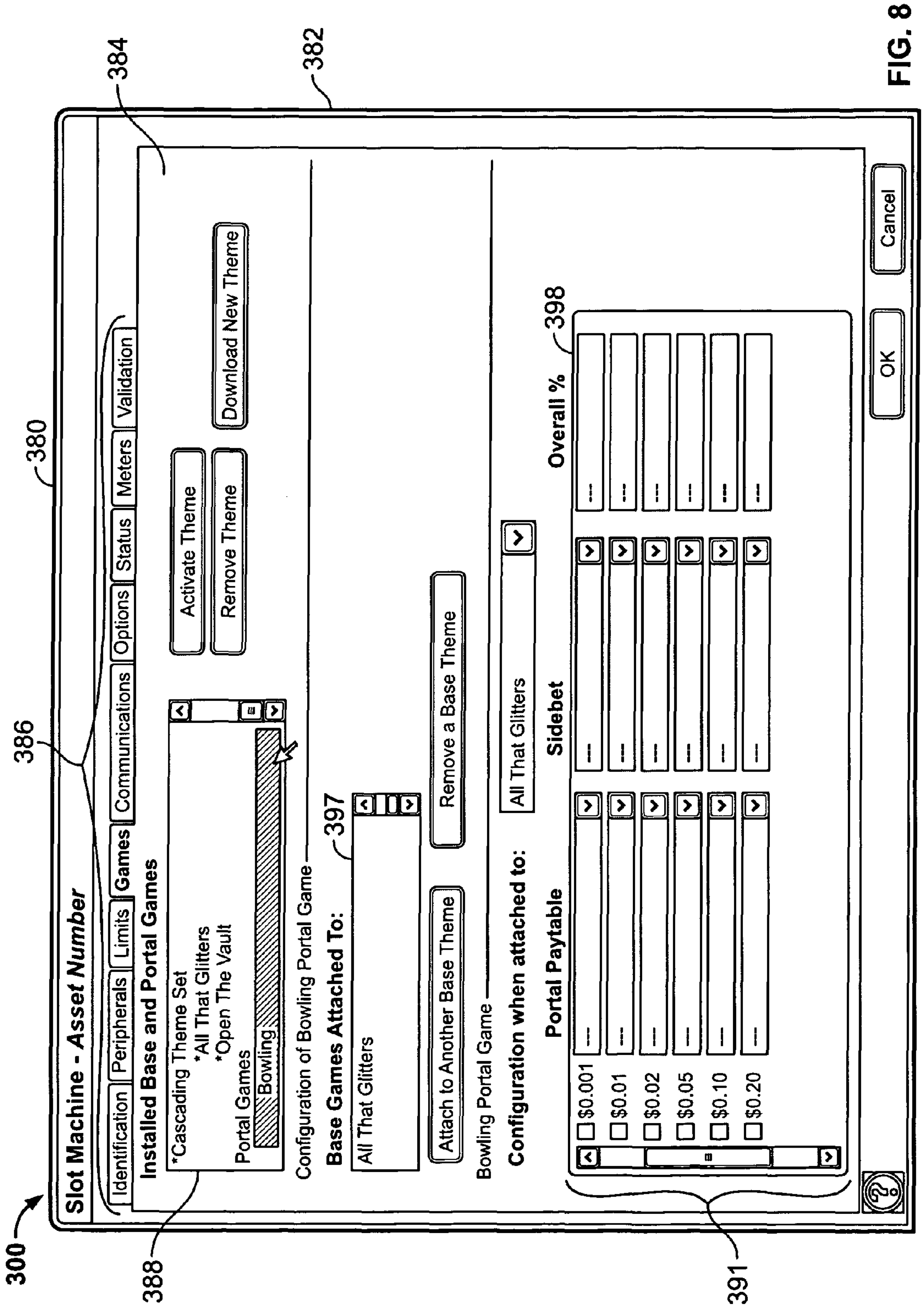
FIG. 8 is another screen shot of the control terminal of FIG. 4, showing configuration of a supplemental feature.

In addition to general activation of the feature, and association with a theme, as described with reference to FIGS. 5-7, the operator may configure and customize each Portal Game on a "per-denomination" basis. As seen in FIG. 8, the operator has selected the Portal Game which has been installed (Bowling), which is shown as highlighted in the list in the Installed Base and Portal Games window 386. Moreover, the middle portion of the control screen 384 now provides the message "Configuration of Bowling Portal Game" so that the operator is informed that he or she is configuring a portal game, not a theme. When a portal game is selected from the window 386 (as opposed to a base game theme), the middle and lower portions of the controls 384 change to indicate parameters relevant to the configuration of the portal game. For example, the middle of the screen 384 now displays an associated base game window 397 which lists all base game themes with which the selected portal game feature has previously been associated.

Thus, in this instance, when the operator selects "Bowling" from the Installed Base and Portal Games window 388, the associated base game window 397 of the control screen 384 further shows that the Bowling Portal Game is attached to the theme "All That Glitters," as a result of the operator's associating the feature with that theme. A feature configuration table 398 appears on the lower portion of the control screen 384 (replacing the theme configuration table of FIGS. 4-7). The feature configuration table 398 allows the operator to configure various parameters of the selected and activated Bowling portal game feature. The feature configuration table 398 includes a plurality of denominations 391 which the operator can select and configure individually, such that the Bowling Game feature is available for play on such denominations 391.

Figure 9:
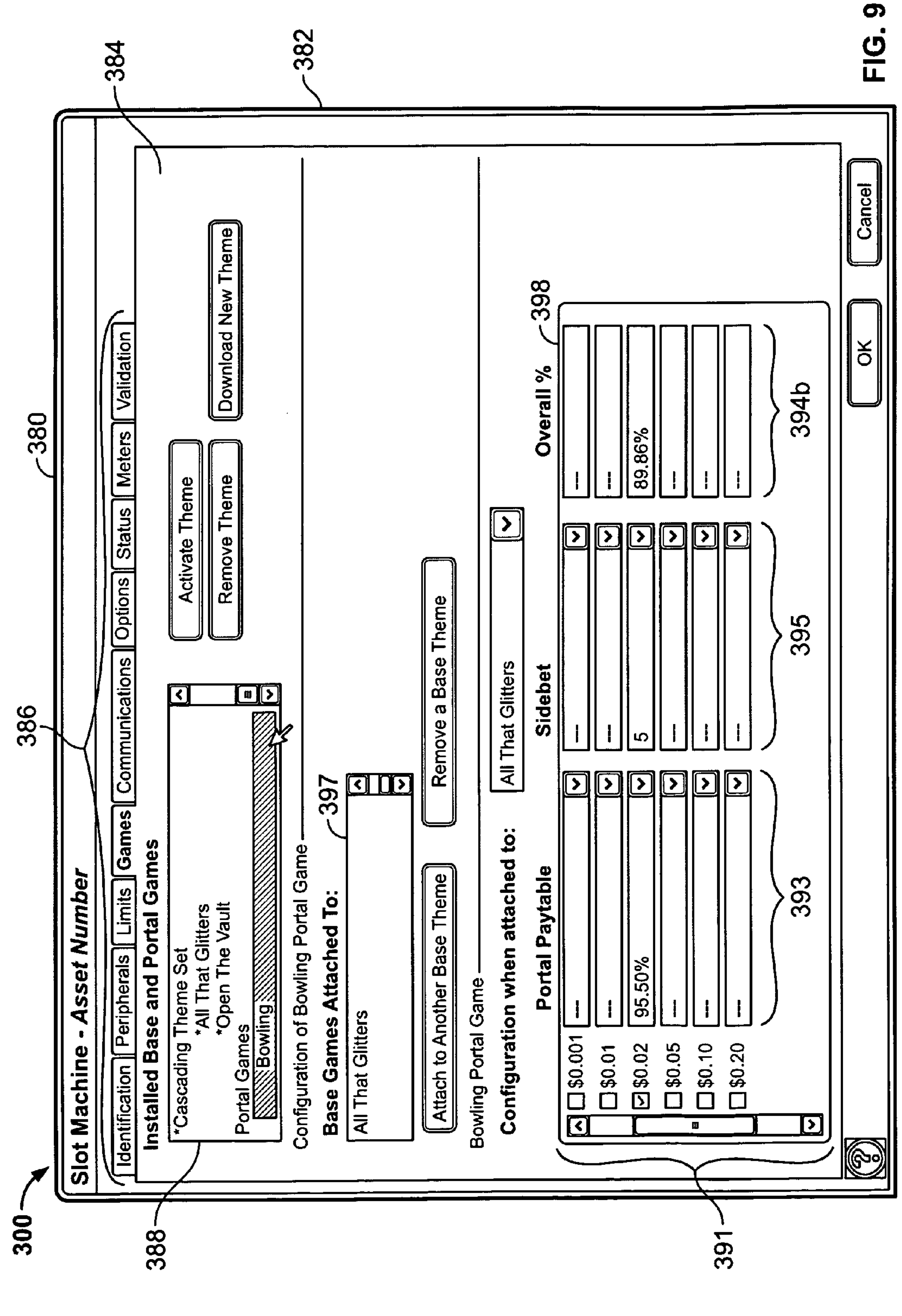
FIG. 9 is another screen shot of the control terminal of FIG. 4, showing configuration of a first denomination of a supplemental feature.

For example, turning to FIG. 9, the operator has configured the Bowling portal game feature to be available on the $0.02 denomination for the theme "All That Glitters." To do so, in this embodiment, the operator uses the mouse to select the check-box next to the $0.02 denomination in the feature configuration table 398, to activate the Bowling Feature on that denomination 391. Moreover, the operator selects from the pull down selections a Feature Payback Percentage and a Side Bet Amount. In this instance, the operator has selected a 95.50% Feature Payback Percentage and a 5 credit Side Bet amount.

The Side Bet amount (5 credits) is a unit supplemental wager amount which the player must wager in order to play the Bowling Feature in addition to the primary wagering game "All That Glitters. The Side Bet is a unit amount which is in fixed proportion with a minimum qualifying primary wager. Thus, in actual play, a player may be required to place a side bet which is greater that the amount reflected in the Side Bet window in the feature configuration table 398. For example, in this instance, in order to be eligible to play a supplemental feature, a player must place a minimum primary wager of one credit on each and every available payline. Thus, because the $0.02 denomination of the “All That Glitters” theme has 20 available paylines (see theme configuration table 392 in FIGS. 4-7), the player must wager one credit per payline (for a total of 20 credits) to be eligible to play the Bowling portal game. If the player wagers the requisite 20 credits, then he must place a side wager of 5 credits (the Side Bet amount) on the Bowling portal game. If the player wagers more than the minimum qualifying primary wager (for example, 4 credits per line for a total of 80 credits), the player must pay a proportionately increased side wager amount of 20 credits (the Side Bet amount of 5 credits multiplied by the 4 credits per line the player has chosen to wager). Thus, the actual amount of a player’s side wager will vary proportionately with how many credits per line the player chooses to play. However, the Side Bet amount shown in the feature configuration table 398 reflects the unit side bet amount required for the minimum qualifying primary wager. Other parameters of the portal game feature may be configurable as well, either via the feature configuration table 398 or elsewhere.

An Overall Payback Percentage is calculated automatically, for the activated denomination, and is a function of the Primary Payback Percentage of the Installed Theme “All That Glitters”, the wager amount on the primary wagering game (the minimum qualifying primary wager), the Feature Payback Percentage of the Bowling feature, and the Side Bet amount required to play the feature. The calculation of the Overall Payback Percentage is explained further herein. Given the operator’s selections in this instance, the Overall Payback Percentage of the combined play of the “All That Glitters” primary wagering game with the Bowling portal game feature, at the $0.02 denomination, is 89.86%, as shown in the Overall Payback Percentage column of the feature configuration table 398.

Figure 10:
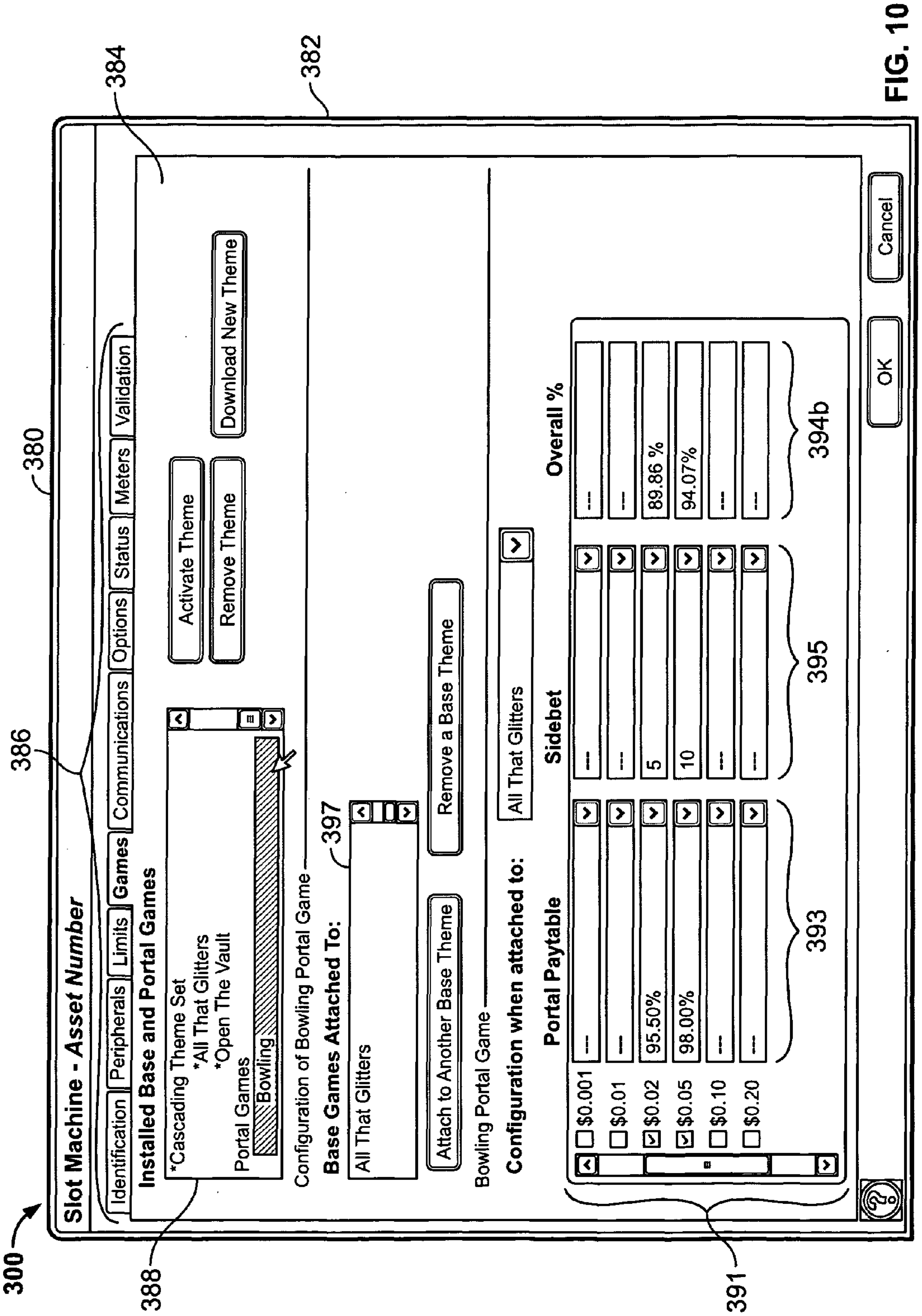
FIG. 10 is another screen shot of the control terminal of FIG. 4, showing configuration of a second denomination of a supplemental feature.

Turning to FIG. 10, the operator has selected another denomination for which to activate the Bowling portal game feature. In this instance, the operator has activated the feature for the $0.05 denomination, and has selected a 98.00% Feature Payback Percentage, with a 10 credit Side Wager amount. This has resulted in an Overall Payback Percentage of 94.07% for the combined play of the “All That Glitters” primary wagering game with Bowling portal game feature, at the $0.05 denomination. Thus, following the configurations performed in FIGS. 9 and 10, the Bowling game is an available supplemental portal game feature for players playing the “All That Glitters” primary wagering game 360 at the $0.02 or $0.05 wager denominations.

Figure 11:
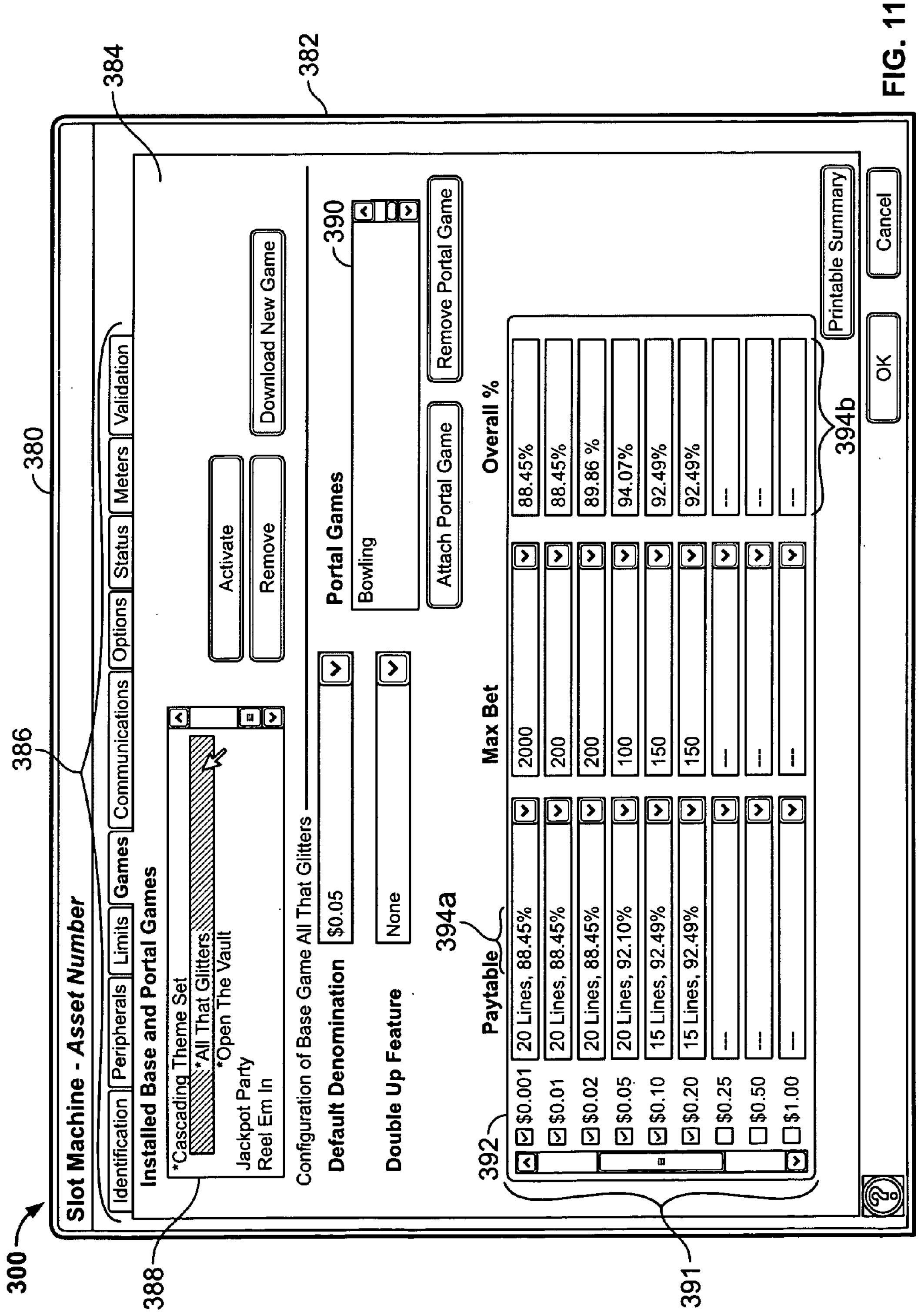
FIG. 11 is another screen shot of the control terminal of FIG. 4, showing modified overall payback percentages as a result of activation and configuration of a supplemental feature.

Turning to FIG. 11, the control screen 384 once again displays the operator clicking on the theme “All That Glitters” in the Installed Base and Portal Games window 388, following configuration of the Bowling portal game feature on the two specified denominations. The theme configuration table 392 returns to replace the feature configuration table 398. The message “Configuration of Base Game All That Glitters” returns on the control screen 384 so that the operator is informed that he has returned to configuring the base game rather than the portal game. The theme configuration table 392 once again shows the Overall Payback Percentages of the various denominations of the primary wagering game. However, the denominations for which the Bowling Portal Game have been activated and configured are now updated, and different from those prior to activation (as seen in FIG. 5). Thus, for the $0.02 denomination, the Overall Payback Percentage is 89.86% (up from 88.45% in FIG. 5). Similarly, for the $0.05 denomination, the Overall Payback Percentage is 94.07% (up from 92.10% in FIG. 5). Thus, once one or more features have been activated for a particular denomination, the display of the Overall Payback Percentage is changed to reflect the newly calculated Overall Payback Percentage. As can be seen, by activating one or more portal game features made available for players, the operator can provide a wagering experience having an increased overall payback percentage. Once configuration is complete, the Overall Payback Percentages shown in the theme configuration table 392 correspond to those shown in the feature configuration table 398.

Figure 12:
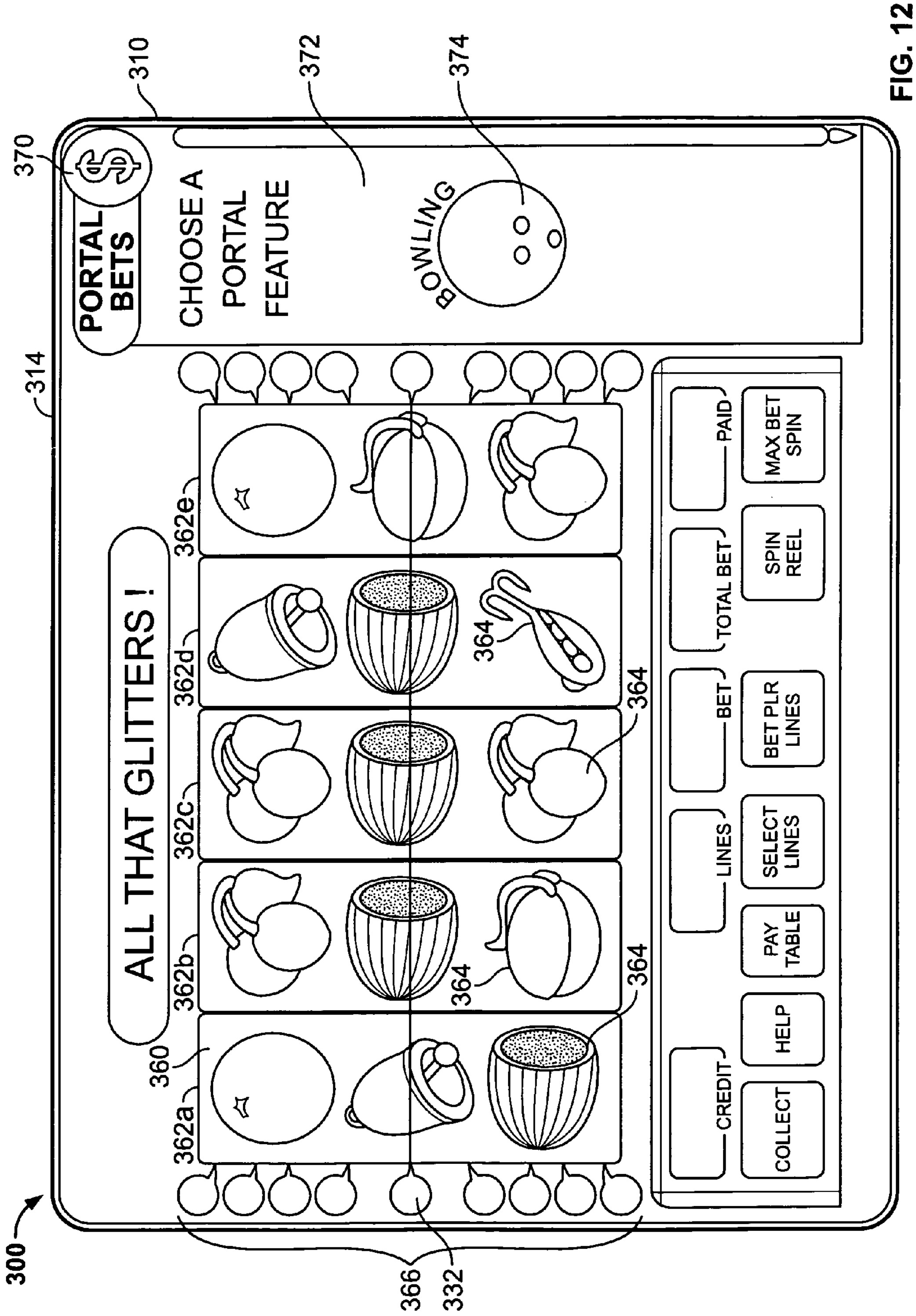
FIG. 12 is a screen shot of the primary display of FIG. 3 displaying an activatable supplemental feature on the feature menu.

Turning to FIG. 12, the primary display 314 of the gaming device 310 from FIG. 3 is again displayed. Now that the Bowling portal game feature 374 has been activated, it appears on the feature menu 372 on the right side of the display 314. Thus, once activated by the operator, the Bowling portal game feature is selectable or activatable by a player of the “All That Glitters” primary wagering game 360, for the cost of a supplemental wager or side bet in the amount of the appropriate Side Bet, as configured. Thus, the operator uses the operator display 380 and computer 382 to activate and make available certain portal game features and to associate them for available play with certain primary wagering games 360 or themes, and at certain denominations. Other supplemental features, upon activation, will also appear in the feature menu 372. Any or all of the available supplemental features may be activated by a player, subject to any rules or eligibility requirements of the system 300.

As described, in an embodiment, selection and activation of one of the features 374 requires input of an additional wager in the form of a secondary wager, side bet, or other monetary input. Thus, in one embodiment, selection of a desired feature 374 causes a player’s wager account to be debited in an appropriate amount associated with the feature. In an alternative embodiment, one or more of the features 374 may be activated or selected without placing additional wagers or incurring additional fees. In yet another alternative embodiment, the cost of additional features 374 may be debited from or supplied by player loyalty points, frequent player points, comps, player tracking card points, a designated feature fund, or other collected secondary economy accounts, instead of or in addition to currency wagers.

An Overall Payback Percentage of a wagering game (the payback percentage of the primary wagering game 360 plus one or more activated portal games or supplemental features) may be calculated as a function of the Primary Payback Percentage (the payback percentage of the primary wagering game 360) as well as the Feature Payback Percentages of any of the portal games or features 374 which have been enabled. When activated, the primary wagering game 360 is configured or set to a Primary Payback Percentage (as seen in FIG. 4), which can be the same or different based upon denomination. This Primary Payback Percentage may be adjusted (upward or downward) in response to activation of one or more of the portal games. Each of the portal games has its own corresponding Feature Payback Percentage (again, for each denomination) that may be higher or lower than the corresponding Primary Payback Percentage. Thus, the Overall Payback Percentage for each denomination is a function of, and affected by, the Feature Payback Percentages of each activated features. The Overall Payback Percentage is also a function of the relative sizes of the primary wager (the minimum qualifying primary wager of the primary wagering game 360 making the player eligible to play the supplemental feature) and any required supplemental wagers (Side Bets)

for activating the selected portal game. Thus, in an embodiment, the Overall Payback Percentage is given by Equation 1 below, wherein "OPP" stands for Overall Payback Percentage, "PPP" stands for Primary Payback Percentage, and "FPP" stands for Feature Payback Percentage:

$$OPP = \frac{(PPP)(\text{Bet}_{Primary}) + (FPP_1)(\text{Side Bet}_1) + (FPP_2)(\text{Side Bet}_2)}{\text{Bet}_{Total}} \quad \text{Equation 1}$$

Thus, in an example configuration, a player is seated at a gaming device displaying the "All That Glitters" primary wagering game 360 as described herein. The player selects a denomination of $0.05 (which has a Primary Payback Percentage of 92.10%, as seen in FIG. 4) and places a minimum qualify wager of 20 credits (20 lines at 1 credit per line, for a total of 20 credits at $0.05 per line, or $1.00). In addition, the player activates the available Bowling portal game (which for the $0.05 denomination has a Feature Payback Percentage of 98.00%, as seen in FIG. 10) and pays the requisite Side Bet of 10 credits (as seen in the feature configuration table 398 in FIG. 10). In such an example, the Overall Payback Percentage of the gaming system configured in such a manner is calculated as seen in Equation 2 below:

$$OPP = \frac{(0.9210)(20) + (0.9800)(10)}{30} = 0.9407 = 94.07\% \quad \text{Equation 2}$$

Therefore, in the example given, the Overall Payback Percentage (for the $0.05 denomination) is 94.07 percent, as is reflected on the control screen 384 in FIGS. 10 and 11. The calculation of the Overall Payback Percentage is the same if the player makes a larger bet, because the side wager required is directly proportionately linked to the minimum qualifying primary wager, as explained. Thus, for example, if the player chooses to place a maximum bet (5 credits per line, time 20 lines, for total of 100 credits at $0.05 per credit, or $5.00), the requisite side wager will be 50 credits (Side Bet amount of 10 credits times 5 credits per line on base game). Therefore, the calculation of the Overall Payback Percentage yields the same result as seen in Equation 3 below:

$$OPP = \frac{(0.9210)(100) + (0.9800)(50)}{150} = 0.9407 = 94.07\% \quad \text{Equation 3}$$

As seen, changes in the payback percentages of either the primary wagering game or any of the activated bonus features affect the Overall Payback Percentage. Moreover, changes in the unit Side Bet amount also affect the Overall Payback Percentage of a primary wagering game (per denomination). Also, activation of additional bonus features would further affect the Overall Payback Percentage. Thus, for a primary wagering game having a primary payback percentage and a minimum qualifying primary wager, having at least one bonus feature activated, the general equation for the Overall Payback Percentage is given in Equation 4, where N features are enabled, each having a unit Side Bet amount:

$$OPP = \frac{(PPP)(\text{Wager}_{Primary}) + \sum_{X=1}^{N} (FPP_X)(\text{Side Bet}_X)}{\text{Bet}_{Total}} \quad \text{Equation 4}$$

In an embodiment, activation of successive additional features 374 causes the Overall Payback Percentage to increase. In other words, with each successive feature that is enabled, the Overall Payback Percentage increases due to the addition of a feature 374 having a higher payback percentage. However, although features 374 having increasingly higher payback percentages are permitted to be activated, in an embodiment one or more rules of a rule set may limit the Overall Payback Percentage to be within a predefined range. Thus, for example, the Overall Payback Percentage of a particular base game theme and one or more activated portal games may be limited, for example, to be within the range of 80% to 98%. Other embodiments and configurations are possible as well. Various controls or mechanisms may be used by the rule set to accomplish such a limiting function. For example, features 374 or subsets thereof may be deactivated so as to be unable to be selected if activation would force the Overall Payback Percentage out of the allowable range.

The control screen 384 and other elements displayed to the operator in the FIGURES herein are only examples of possible configurations of the system 300. Many other configurations may be used so as to allow an operator to view, select, and configure primary wagering games and available portal games and supplemental features. The various configurations may use graphical displays to visually link supplemental features with primary wagering games. Moreover, the control screen may permit configuration of parameters of wagering games beyond those described herein and displayed in the FIGURES. In alternative embodiment, the control screen 384 is contained in a handheld device which the operator may use to configure one or more primary wagering games and/or features as he walks through a casino floor, for example. In such an embodiment, the handheld device may be in communication with a central configuration server or computer, or the handheld device itself may comprise the control terminal discussed herein.

The system 300 as described and shown in various embodiments herein, offers a number of advantages over traditional systems. The operator control terminal 382 and display 380 allow a casino operator to quickly and easily navigate and configure primary wagering games and available portal games (or supplemental features) throughout the casino. By using the control terminal 382, the operator can quickly view the Overall Payback Percentage, by denomination, of various combinations of primary wagering games and supplemental features. This allows the operator to customize and hone in on a desired overall payback percentage by adjusting the type and number of supplemental features enabled, the side bets required thereon, and the payback percentages of the features. Moreover, the operator can create customized packages of primary games and supplemental games, and save such configurations, such that they are available for easy recall. In this way, the system acts to provide an operator with a new and improved method of controlling a casino floor. The system allows easy, quick, and informed association and disassociation of supplemental features with primary wagering games.

Figure 13:
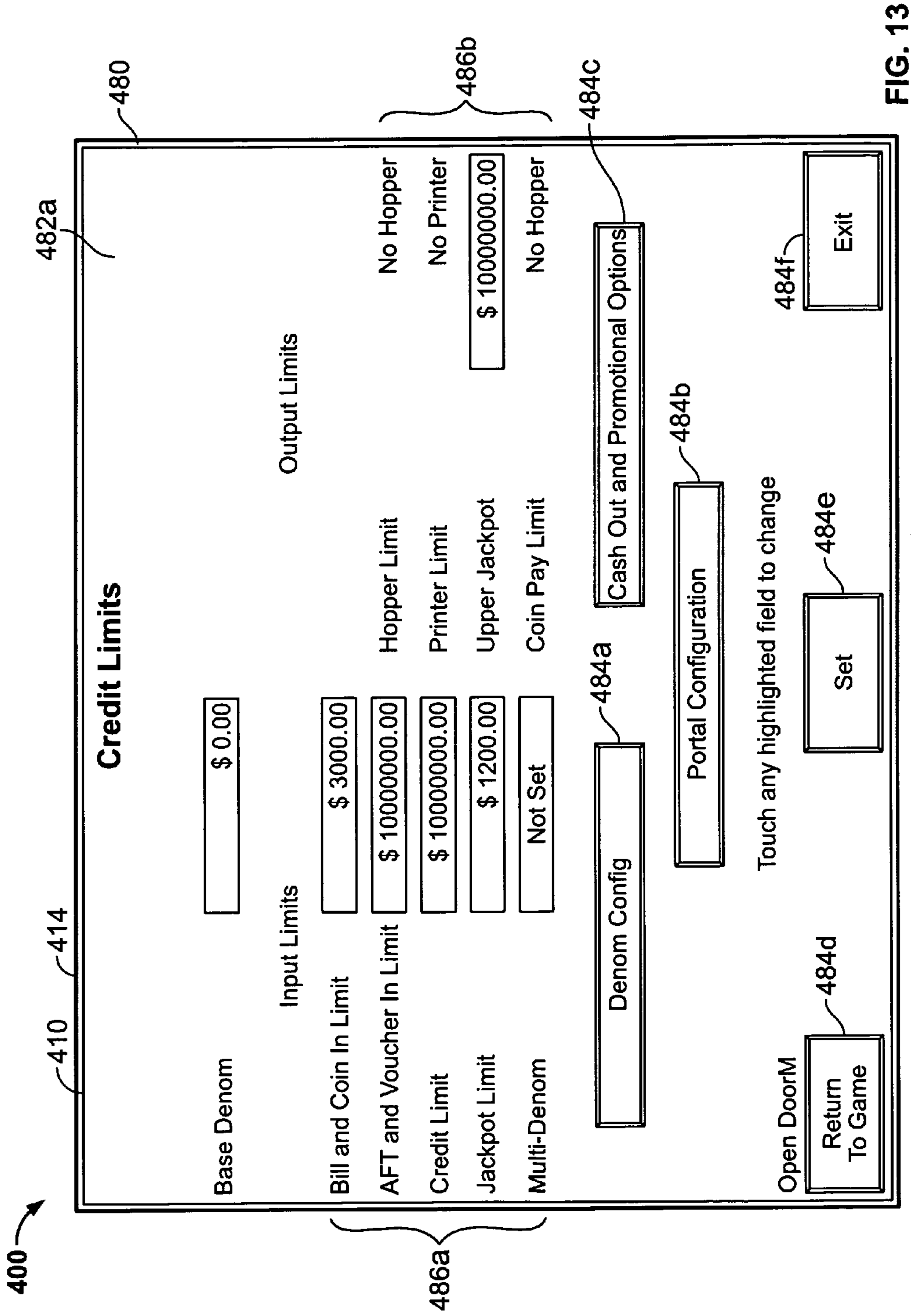
FIG. 13 is a screen shot of a gaming device of an alternative embodiment of a gaming system depicting a control screen for administering and configuring supplemental features.

Turning to FIGS. 13-17, a primary display 414 of a gaming device 410 of a gaming system 400 is shown displaying a configuration control interface 480. As with other embodiments, the gaming device 410 displays the execution of one or more primary wagering games 460 and one or more supplemental features 474. In this embodiment, the control interface 480 appears on a display 414 of a gaming device 410, such as the free standing and handheld gaming devices depicted and described in relation to FIGS. 1*a* and 1*b*. Through one or more inputs via a player input device 424, an operator or administrator can activate the configuration control interface 480 to be displayed on the primary display 414 or other display of the gaming device 410. As seen in FIG. 13, an initial screen 482*a* of the control interface 480 is shown which includes touch key input selections for configuring games by denomination (Denom Config 484*a*), for configuring supplemental features (Portal Configuration 484*b*) and for other options (Cash Out and Promotional Options 484*c*). Moreover a plurality of Input Limits 486*a* and Output Limits 486*b* are listed on the initial screen 482*a* of the control interface 480, which are available so that the operator or administrator of the gaming system 400 can configure and adjust other options such as credit limits, jackpot limits, coin in limits, etc. The initial screen 482*a* further includes touch keys for returning to the wagering game (Return to Game 484*d*), for setting the configured options (Set 484*e*), and for exiting the control interface 480 (Exit 484*f*). In the example shown in the FIGURES, the operator has selected and touched the Portal Configuration 484*b* key to begin configuring the wagering games 460 and supplemental features 474 on the gaming device 410.

Figure 14:
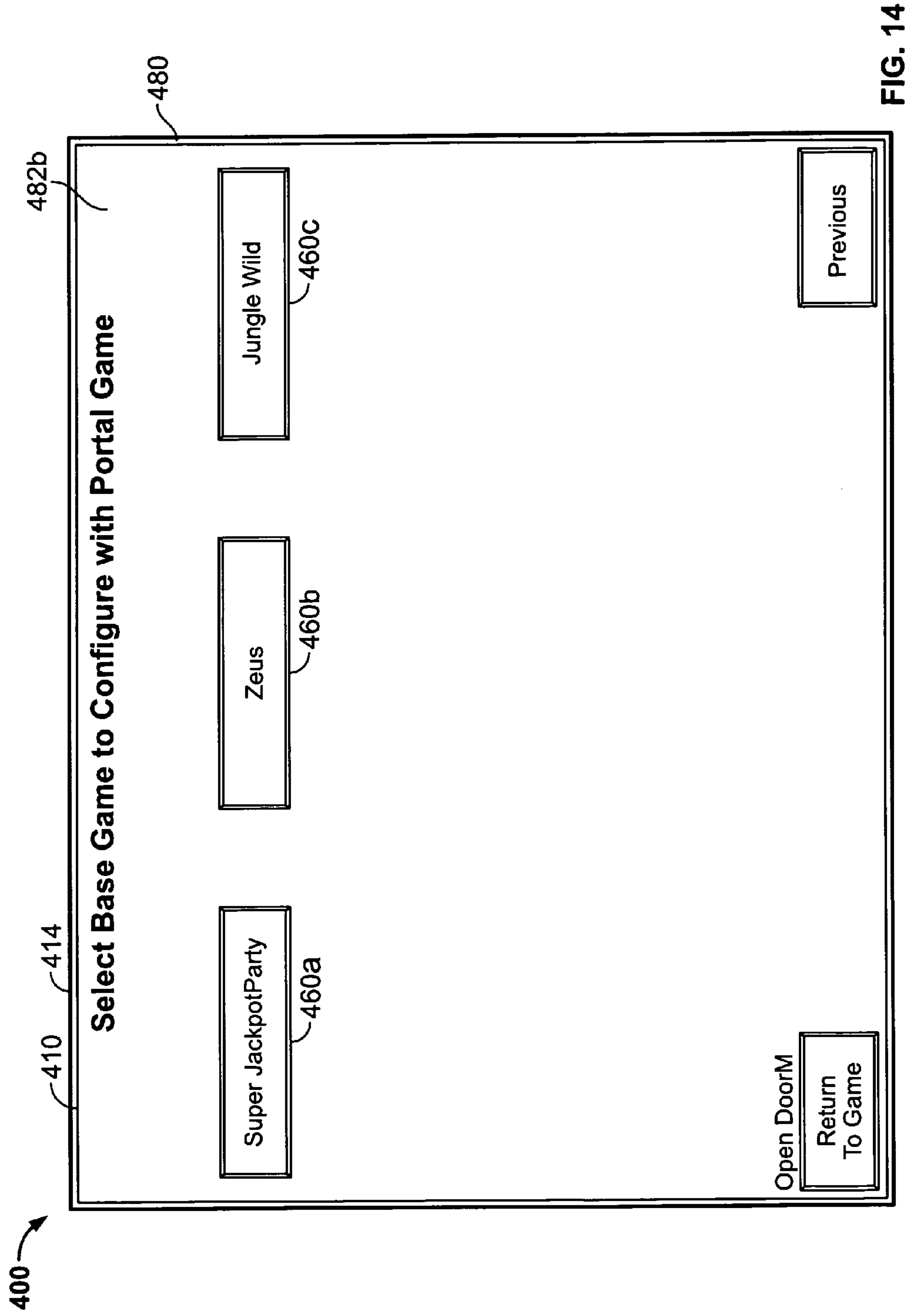
FIG. 14 is a further control screen of the gaming system of FIG. 13; depicting selection of a primary wagering game.

In FIG. 14, in response to selecting the Denom Config 484*a* key, the control interface 480 cycles to a second screen, which is a primary wagering game selection screen 482*b*. On this screen 482*b*, a plurality of primary wagering games 460*a,b,c* which are available are displayed on the control interface 480. Thus, in the embodiment shown, the primary wagering games 460*a,b,c* "Super Jackpot Party," "Zeus" and "Jungle Wild" are all loaded and available for activation, as well as for configuration, customization and adjustment. In the example shown, the operator selects "Super Jackpot Party" as the primary wagering game 460*a* to be configured.

Figure 15:
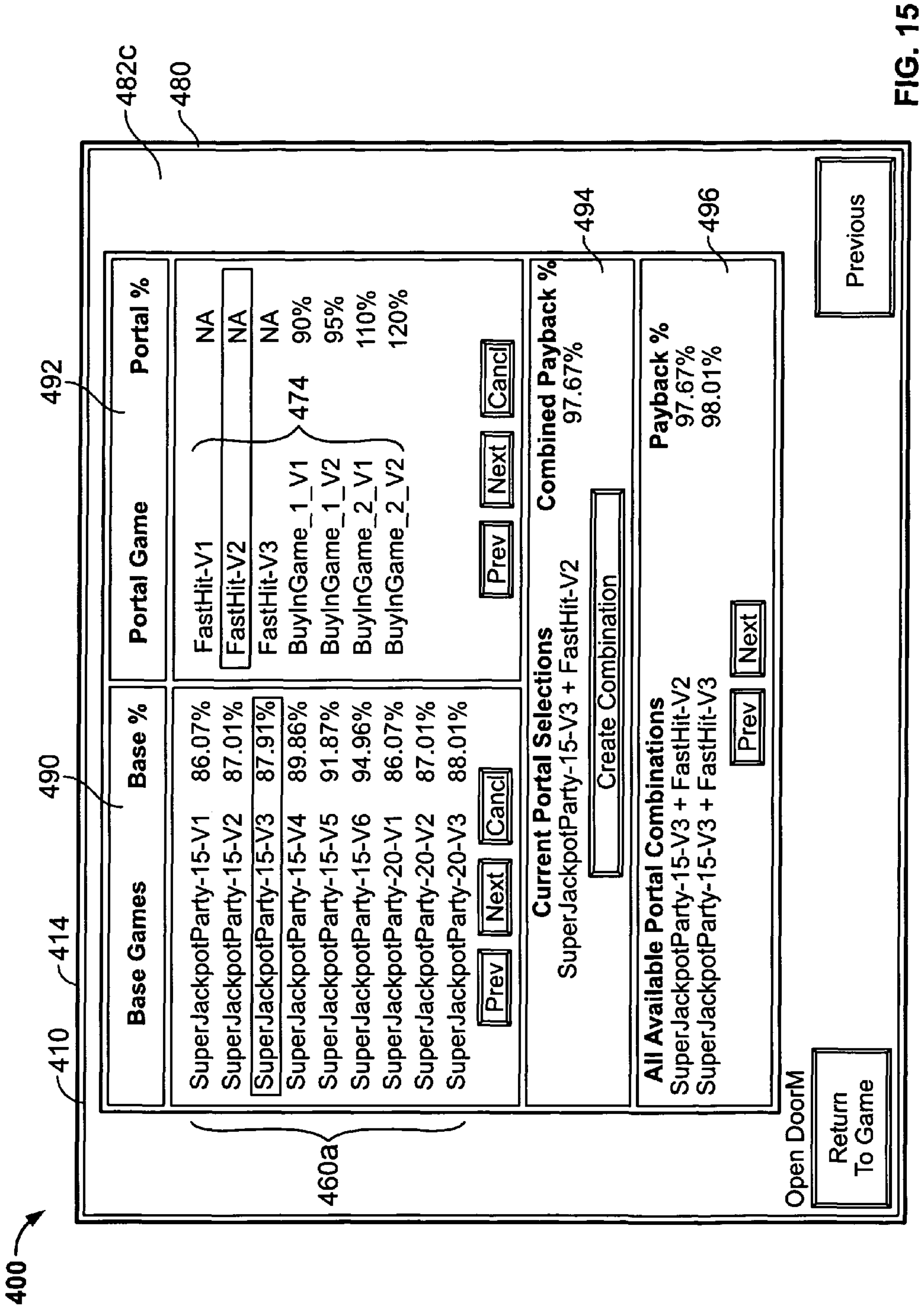
FIG. 15 is a further control screen of the gaming system of FIG. 13, depicting configuration of supplemental feature combinations.

Turning to FIG. 15, a combination creation screen 482*c* of the control interface 480 is displayed. The combination creation screen 482*c* includes a primary wagering game selector 490, a portal game selector 492, a combination creator 494 and a created combinations listing 496. The primary wagering game selector 490 lists the different versions of the selected primary wagering game 460*a* "Super Jackpot Party." Included in the primary wagering game selector 490 lists is the name of the primary wagering game (Super Jackpot Party), the number of paylines available in the version (15 and 20 line versions shown), the version number for each payline configuration (V1 through V6 for 15 paylines and V1 through V3 for 20 paylines), and the primary payback percentage (or Base %) for each version of the primary wagering game 460*a*. The portal game selector 492 is similar and includes a listing of available portal features 474 (e.g. Fast Hit game, Buy In Game 1, Buy In Game 2), the version number for each type of portal feature 474, and a feature payback percentage (Portal %) for each version of the portal features 474. It should be understood that the listings in the primary wagering game selector 490 and the portal game selector 492 can include greater or fewer selectable games which can be navigated or scrolled, for example, using the "Prey," "Next" and "Cancel" buttons in each selector 490,492.

The combination creator 494 is used to couple or combine a selected version of the primary wagering game 460*a* with one or more of available versions of supplemental features 474, and to store the combinations in the created combinations listing 496. In the embodiment shown in FIG. 15, the operator has selected Version 3 of the 15 line Super Jackpot Party primary wagering game 460*a* from the primary wagering game selector 490 which is shown highlighted in the list. Similarly, the operator has selected Version 2 of the Fast Hit game supplemental feature 474 from the portal game selector 492 which is shown highlighted. The combination creator 494 includes a listing of a "Combined Payback %" which is an overall payback percentage for the selected primary wagering game 460*a* and any activated portal features 474. Thus, by trying different combinations of base games 460*a* and portal games 474, an operator can hone in on a desired overall payback percentage. For the combination selected by the operator in FIG. 15, the Combined Payback Percentage is 97.67%. Because the operator is satisfied with this combination, and would like to retain it for future use and activation, the operator selects the "Create Combination" button 484*g* to create and "save" the combination. The created combination is then saved and displayed as an available portal combination in the created combinations listing 496. Thus, once a combination is created and saved by an operator, it remains available for activation and use on the gaming system 400 immediately or at some later time.

Figure 16:
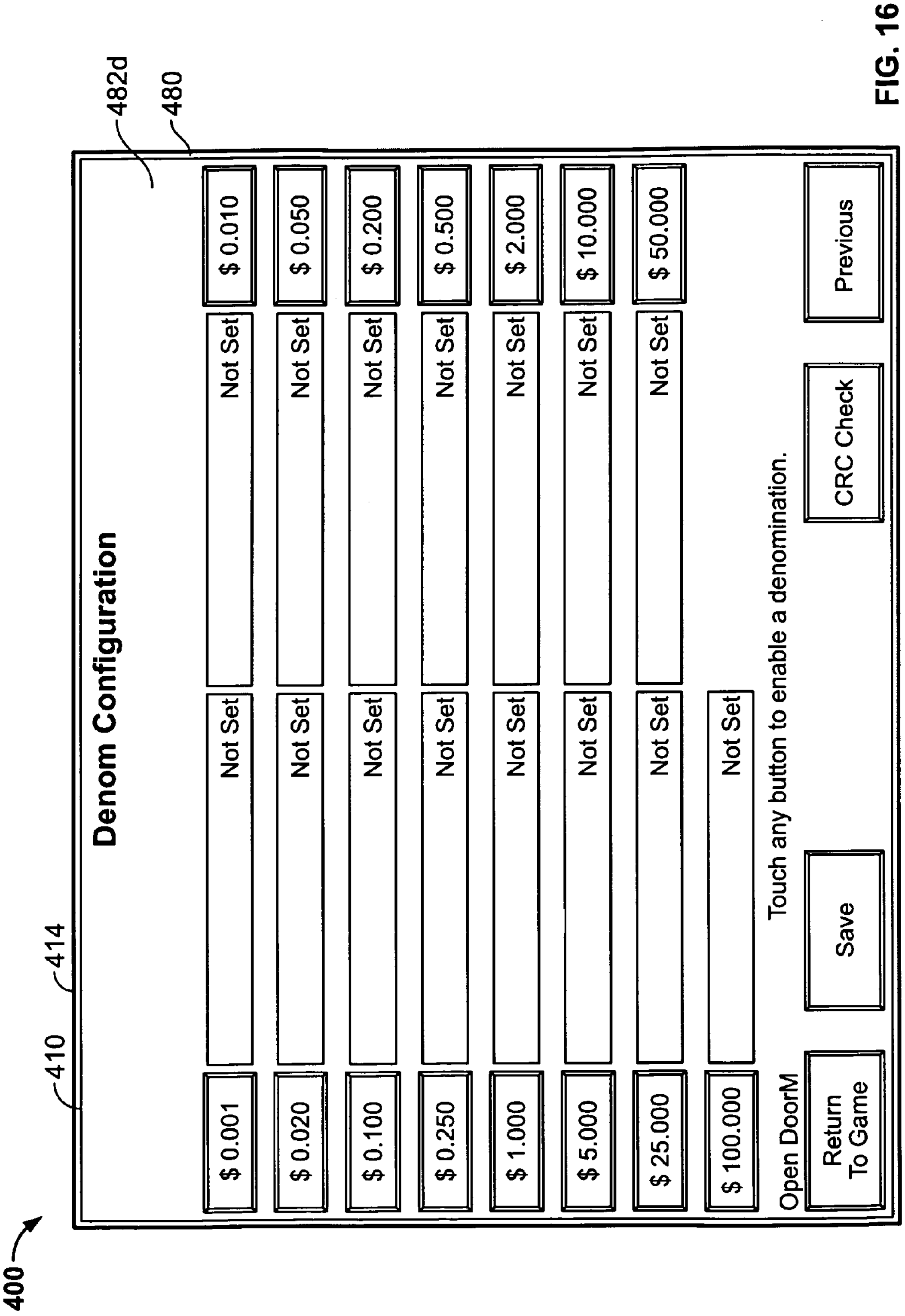
FIG. 16 is a further control screen of the gaming system of FIG. 13, depicting configuration by denomination.

From the initial screen 482*a* (FIG. 13), the operator can then select the Denom Config 484*a* button to begin configuring wagering games 460 and supplemental features 474 by denomination. Once the Denom Config 484*a* button is pressed, the control interface 480 displays a denom configuration screen 482*d*, as seen in FIG. 16. The denom configuration screen 482*d* lists available wager denominations ($0.001 through $100.00), which as seen in the example in FIG. 16 have not yet been set. By touching one of the denominations, an operator can configure that denomination and the primary wagering games 460, supplemental features 474, and combinations thereof which are activated for that denomination. Here the operator selects the $0.020 denomination to configure.

Figure 17:
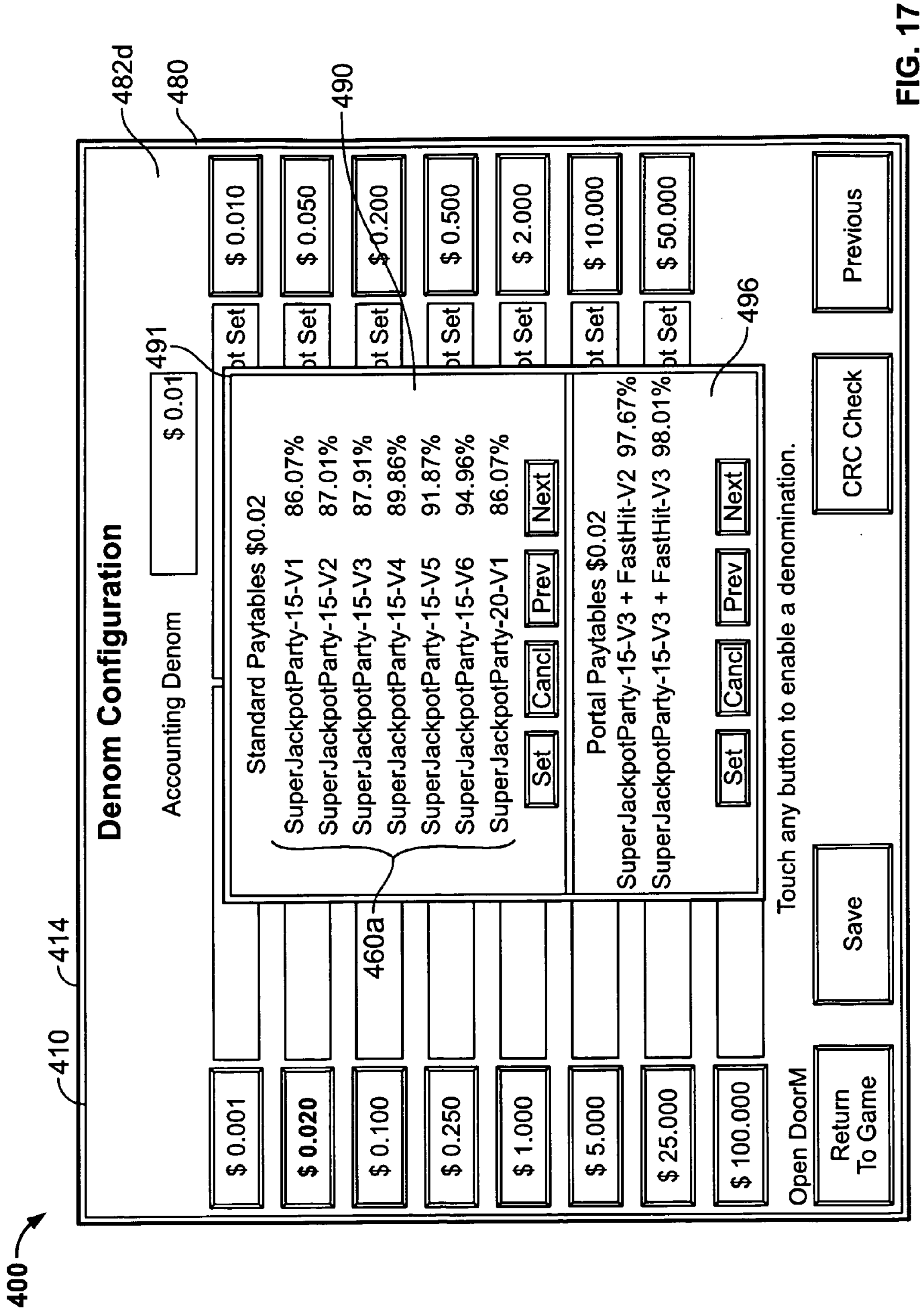
FIG. 17 is a further control screen of the gaming system of FIG. 13, depicting configuration of a specific denomination.

Turning to FIG. 17, a subsequent view of the denom configuration screen 482*d* is displayed wherein a pop up window 491 appears overlying the listing of denominations and the selected denomination ($0.020) appears highlighted. In an upper portion of the pop up window 491, a plurality of configurations of a selected primary wagering game 460*a* are listed, which in this case is Super Jackpot Party. The available versions of the selected primary wagering game 460*a* displayed are the same as those displayed in the primary wagering game selector 490 of the combination creation screen 482*c* (FIG. 15). In a lower portion of the pop up window 491 is a list of available combinations of primary wagering games 460*a* and portal features 474. The list of available combinations is the same as the list of created combinations stored in the created combinations listing 496 of the combination creation screen 482*c*. Thus, an operator can assign to the selected denomination either a selection from the top portion of the pop up window 491 (a base game only) or a selection from the bottom portion of the pop up window 491 (a base game combined with one or more portal features). Both the top and bottom portions of the pop up window 491 list the payback percentages of the available options. For the top portion which lists base games only, the payback percentage is for the primary wagering game only. For the bottom portion which lists combinations, the payback percentage is an overall payback percentage of the base game plus the combined activated portal features.

In this way, the embodiment of FIGS. 13-17 allows an operator to use the configuration control interface 480 locally at a gaming device 410 to configure base games 460 and portal features 474. The operator can use the combination creation screen 482*c* to create combinations of selected base games 460 and portal features 474 to achieve a desired overall payback percentage, and store the configured combinations in the created combinations listing 496 for later recall and activation. Using the denom configuration screen 482*d*, the operator can then activate particular base games 460 or combinations of base games 460 and portal features 474 by recalling from the created combinations listing 496. Thus, an operator selects a denomination to configure and activates either a base game 460 by itself for that denomination, or alternatively activates a stored combination of base game 460 and portal features 474 by selecting from a listing of available combinations stored in the created combinations listing 496 and displayed in a pop-up window 491.

Each of these embodiments and obvious variations thereof is contemplated as falling within the spirit and scope of the claimed invention, which is set forth in the following claims.

What is claimed is:

1. A gaming system comprising:

a wager input device for receiving a primary wager;

at least one display for displaying a selected primary wagering game, the selected primary wagering game having a primary payback percentage;

a control interface for configuring the gaming system displayed on the at least one display, the control interface comprising a plurality of available supplemental features; and at least one controller operative to:

(i) receive an operator activation selection of a supplemental feature selected from the plurality of available supplemental features from the control interface, wherein the operator activation selection configures the gaming machine for play by a player;

(ii) receive an operator configuration selection of at least one parameter of the selected supplemental feature, the at least one parameter including a feature payback percentage of the selected supplemental feature and a side bet amount for the selected supplemental feature, wherein the operator configuration selection configures the gaming machine for play by the player;

(iii) activate availability of the selected supplemental feature for play by the player of the selected primary wagering game, wherein the selected supplemental feature is configured to be eligible for play by the player of the primary wagering game upon receipt of the side bet;

(iv) calculate an overall payback percentage as a function of the primary payback percentage, the primary wager, the side bet and the first feature payback percentage; and (v) display the overall payback percentage on the control interface.

2. The system of claim 1 wherein the at least one controller is further operative to detect receipt of the primary wager, and in response to the detection, display a randomly selected outcome of the selected primary wagering game on the at least one display.

3. The system of claim 1, wherein the overall payback percentage is a function of the side bet amount.

4. The system of claim 3, wherein the overall payback percentage is a function of the amount of the primary wager.

5. The system of claim 1, wherein the control interface further displays a plurality of available primary wagering games including the selected primary wagering game.

6. The system of claim 1, wherein the at least one controller is further operative to activate the selected primary wagering game in response to detecting an operator primary selection at the control interface.

7. A method of operating a wagering game comprising:

displaying a selected primary wagering game on a control terminal, the selected primary wagering game having a primary payback percentage;

displaying a plurality of available supplemental features on a control interface of the control terminal for configuring the wagering game;

receiving an operator activation selection of a supplemental feature selected from the plurality of available supplemental features, the selected supplemental feature having a feature payback percentage, wherein the operator activation selection configures the wagering game for play by a player;

receiving an operator activation selection of a side bet amount for the selected supplemental feature;

activating availability of the selected supplemental feature for play by the player of the selected primary wagering game, wherein the selected supplemental feature is configured to be eligible for play by the player upon receipt of the side bet;

calculating an overall payback percentage as a function of the primary payback percentage, the primary wager, the side bet and the feature payback percentage of the selected supplemental feature; and displaying the overall payback percentage on the control interface of the control terminal.

8. The method of claim 7, wherein the operator activation selection is received via at least one input device in communication with the control interface.

9. The method of claim 7, further comprising receiving an operator configuration selection of at least one parameter of the selected supplemental feature, the at least one parameter including the feature payback percentage.

10. The method of claim 8, wherein the at least one parameter further includes one or more denominations upon which the selected supplemental feature is made available.

11. A method of configuring supplemental features on a gaming system comprising:

displaying on a control terminal for configuring the gaming system a plurality of available primary wagering games and a plurality of available supplemental features;

receiving a selection of a first primary wagering game selected from the plurality of available primary wager games, the first primary wagering game having a primary payback percentage;

receiving a selection of a first supplemental feature selected from the plurality of available supplemental features, the first supplemental feature having a first feature payback percentage and an amount of a side bet necessary to enable the first supplemental feature for play by a player of the first primary wagering game;

calculating an overall payback percentage as a function of the primary payback percentage, the primary wager, the side bet and the first feature payback percentage;

displaying the overall payback percentage on the control terminal; and activating availability of the first supplemental feature for play by a player of the first primary wagering game, wherein the selection of a first primary wagering game and the selection of the first supplemental feature configure the gaming system.

12. The method of claim 11, wherein the control terminal is in communication with a plurality of gaming displays, and further comprising:

in response to receipt of a primary wager from the player, displaying the first primary wagering game on a first one of the gaming displays; and in response to (i) receipt of the side bet from the player and (ii) the primary wager being a minimum qualifying primary wager, displaying the first supplemental feature on the first one of the gaming displays.

13. The method of claim 12, wherein the overall payback percentage is also a function of the amounts of the primary wager and the side bet.

14. The method of claim 13, wherein the overall payback percentage is calculated as the sum of (i) the product of the primary payback percentage and the primary wager and (ii) the product of the first feature payback percentage and the side bet; divided by (iii) the sum of the primary wager and the side bet.

15. The method of claim 11, further comprising configuring the first supplemental feature in accordance with one or more configuration inputs received at the control terminal.

16. The method of claim 15, wherein the one or more configuration inputs includes the required side bet amount and a denomination selection.

17. The method of claim 11, further comprising:

receiving a selection of a second supplemental feature selected from the plurality of available supplemental features, the second supplemental feature having a second feature payback percentage; and updating display of the overall payback percentage on the control terminal, the updated overall payback percentage being a function of the primary payback percentage, the first feature payback percentage and the second feature payback percentage.

18. The method of claim 11, wherein at least one of the primary payback percentage, the first feature payback percentage and the overall payback percentage comprises one or more of a payout percentage and a hold percentage.

19. One or more machine readable storage media encoded with instructions which when executed by at least one processor, causes the processor to:

display a control interface for configuring the gaming system on a primary display of the gaming system, the control interface displaying a plurality of available primary wagering games and a plurality of available supplemental features, each of the plurality of available primary wagering games having a primary payback percentage, and each of the plurality of available supplemental features having a feature payback percentage and are able to be triggered from play of any of the plurality of available primary games;

in response to an operator configuration input via the control interface, store at least one combination of a first primary wagering game and a first supplemental feature, wherein the operator configuration input configures the gaming system for play by a player;

calculate an overall payback percentage as a function of the primary payback percentage, a primary wager, and the first feature payback percentage for the at least one combination of the first primary game and the first supplemental feature;

display the overall payback percentage;

in response to an operator activation input via the control interface, activate a selected wagering game, the selected wagering game comprising the at least one combination of the first primary wagering game and the first supplemental feature; and display the selected wagering game.

20. The computer readable storage media of claim 19, wherein the instructions further cause the at least one processor to display on the control interface a plurality of payback percentages associated with the plurality of available primary wagering games and the plurality of available supplemental features.

21. The computer readable storage media of claim 19, wherein the instructions further cause the at least one processor to receive an operator denomination selection.

* * * * *